United States Patent
Satake

(10) Patent No.: US 8,059,246 B2
(45) Date of Patent: Nov. 15, 2011

(54) LIQUID CRYSTAL DISPLAY DEVICE HAVING PARTICULAR PIXEL ELECTRODES CONFIGURATION

(75) Inventor: Rumo Satake, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 12/489,720

(22) Filed: Jun. 23, 2009

(65) Prior Publication Data
US 2009/0268111 A1    Oct. 29, 2009

Related U.S. Application Data

(62) Division of application No. 11/015,160, filed on Dec. 17, 2004, now Pat. No. 7,554,642, which is a division of application No. 10/004,245, filed on Nov. 1, 2001, now Pat. No. 7,167,226.

(30) Foreign Application Priority Data

Nov. 2, 2000    (JP) .................................. 2000-335919

(51) Int. Cl.
*G02F 1/1343*    (2006.01)
(52) U.S. Cl. ......................... 349/142; 349/143; 349/139

(58) Field of Classification Search .................. 349/139, 349/142, 143
See application file for complete search history.

(56) References Cited

U.S. PATENT DOCUMENTS 5,585,951 A * 12/1996 Noda et al. ..................... 349/122
(Continued)

FOREIGN PATENT DOCUMENTS
EP    0 603 866 A1    6/1994
(Continued)

OTHER PUBLICATIONS

Ueda, T., "Improvement of Aperture Ratio by Shield Electrode Structure," Semiconductor World, '94 the Latest LCD Technology, extra edition, 1993, vol. 12, No. 13, issued on Oct. 15, 1993, pp. 136-138 (with full English translation, pp. 1-6).

*Primary Examiner* — Mike Qi
(74) *Attorney, Agent, or Firm* — Husch Blackwell LLP

(57) ABSTRACT

To reduce an optical leakage and a disclination. In a liquid crystal display device for a gate line inversion drive, of the end portion of a pixel electrode, the portions formed along a scanning line are raised with respect to the main face of the pixel electrode. Of the end portions of a pixel electrode, the portions formed along a signal line are formed to have a height identical to that of the main face of the pixel electrode.

23 Claims, 30 Drawing Sheets

U.S. PATENT DOCUMENTS

| | | | |
|---|---|---|---|
| 5,844,647 A * | 12/1998 | Maruno et al. | 349/110 |
| 5,872,611 A | 2/1999 | Hirata et al. | |
| 5,978,056 A | 11/1999 | Shintani et al. | |
| 6,130,729 A | 10/2000 | Oh et al. | |
| 6,215,541 B1 | 4/2001 | Song et al. | |
| 6,278,504 B1 | 8/2001 | Sung | |
| 6,310,670 B1 | 10/2001 | Lee | |
| 6,346,718 B1 | 2/2002 | Yamanaka et al. | |
| 6,380,561 B1 | 4/2002 | Ohtani et al. | |
| 6,441,877 B1 | 8/2002 | Watanabe | |
| 6,452,648 B2 | 9/2002 | Maeda | |
| 6,555,265 B1 | 4/2003 | Fleming et al. | |
| 6,556,265 B1 * | 4/2003 | Murade | 349/111 |
| 6,597,413 B2 | 7/2003 | Kurashina | |
| 6,628,367 B2 * | 9/2003 | Hirabayashi et al. | 349/187 |
| 6,683,592 B1 * | 1/2004 | Murade | 345/87 |
| 6,734,924 B2 | 5/2004 | Hirakata et al. | |
| 6,801,267 B2 | 10/2004 | Satake | |
| 6,897,909 B2 * | 5/2005 | Ochiai et al. | 349/43 |
| 2001/0048489 A1 | 12/2001 | Izumi et al. | |
| 2002/0036818 A1 | 3/2002 | Kawata | |
| 2002/0063841 A1 | 5/2002 | Hirakata et al. | |
| 2002/0080312 A1 | 6/2002 | Yamaguchi et al. | |

FOREIGN PATENT DOCUMENTS

| | | |
|---|---|---|
| EP | 1 079 260 A2 | 2/2001 |
| JP | 62145218 A * | 6/1987 |
| JP | 7-20497 | 1/1995 |
| JP | 8-78329 | 3/1996 |
| JP | 2000-75297 | 3/2000 |
| JP | 2001-33800 | 2/2001 |
| JP | 2001-42332 | 2/2001 |
| JP | 2001-133749 | 5/2001 |
| JP | 2001-133750 | 5/2001 |
| JP | 2002-40455 | 2/2002 |

* cited by examiner

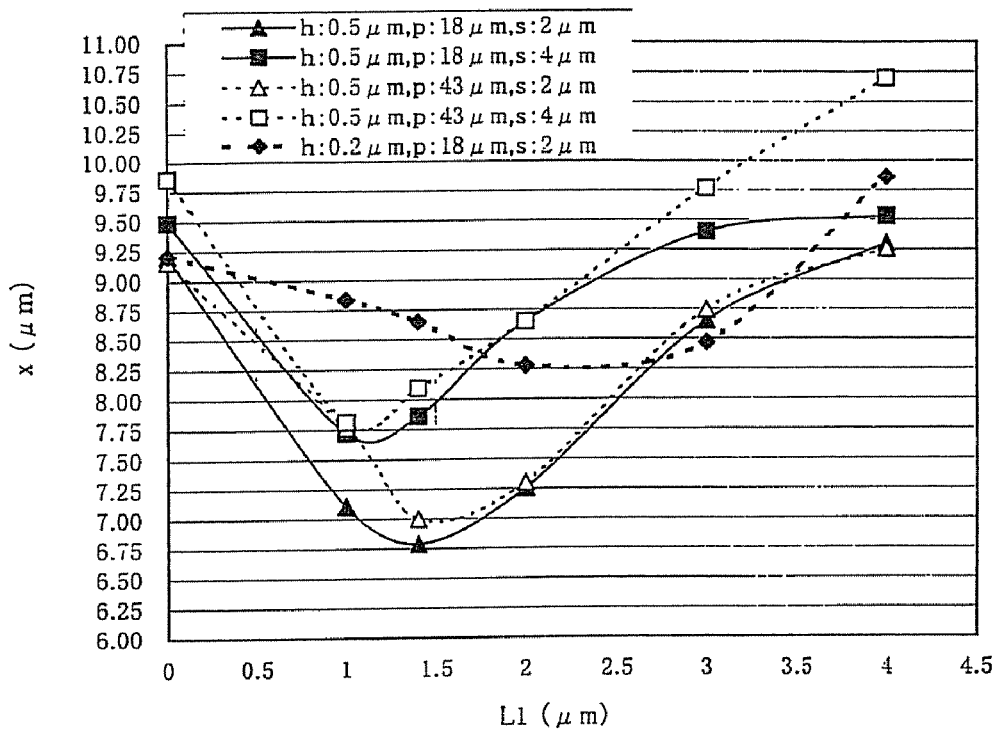
FIG. 11A (cell gap 4.5 μm)
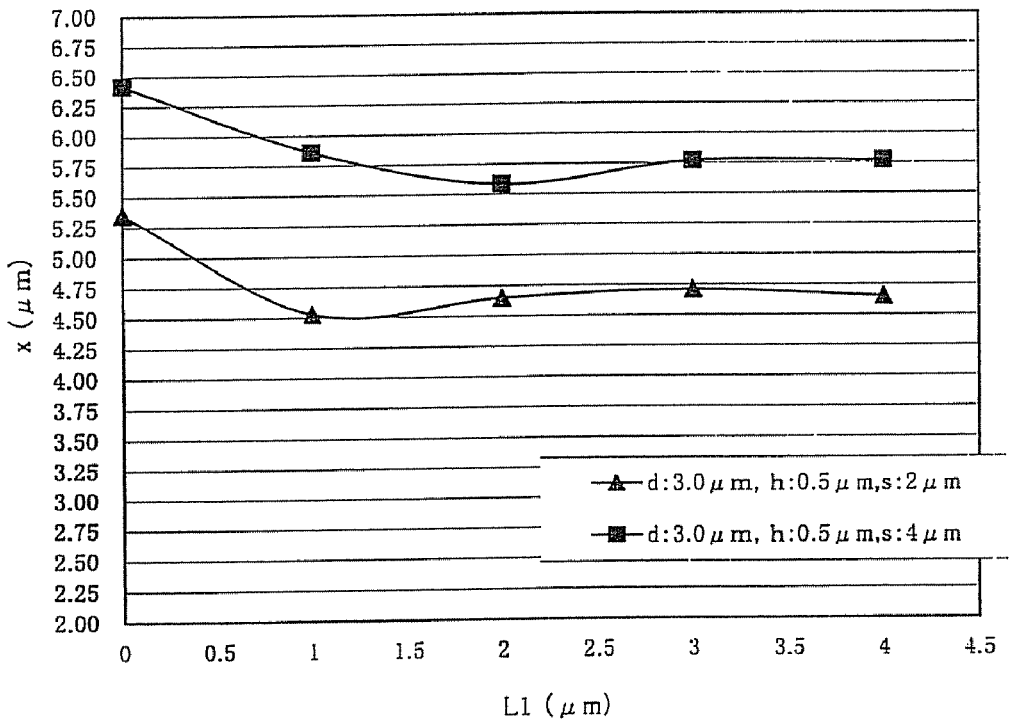
FIG. 11B (cell gap 3.0 μm)

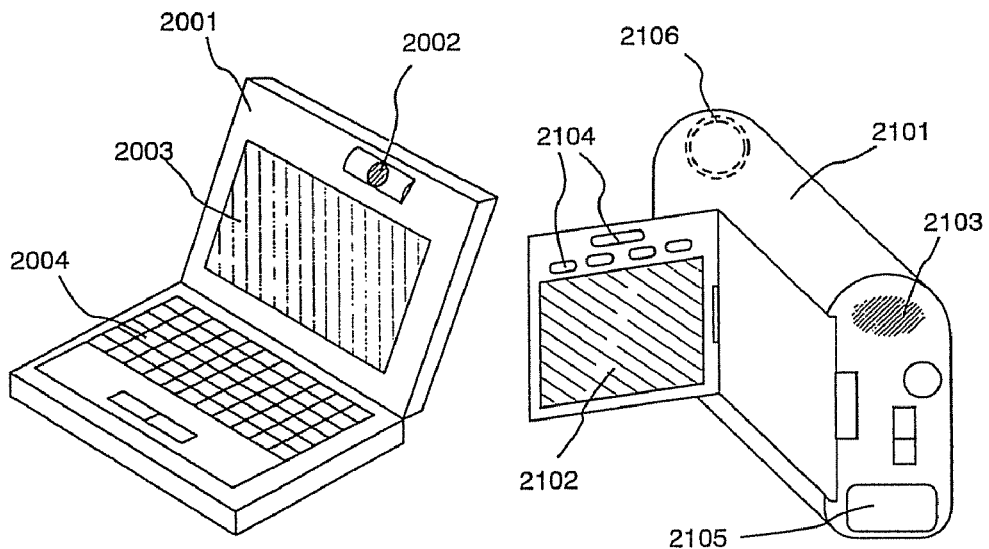
FIG. 25A
FIG. 25B
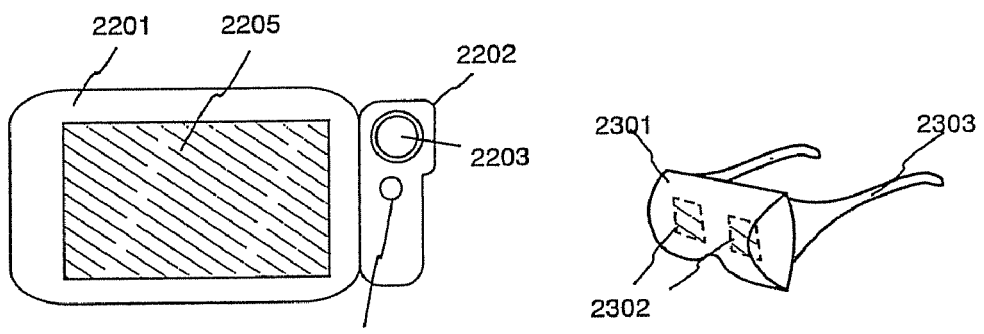
FIG. 25C
FIG. 25D
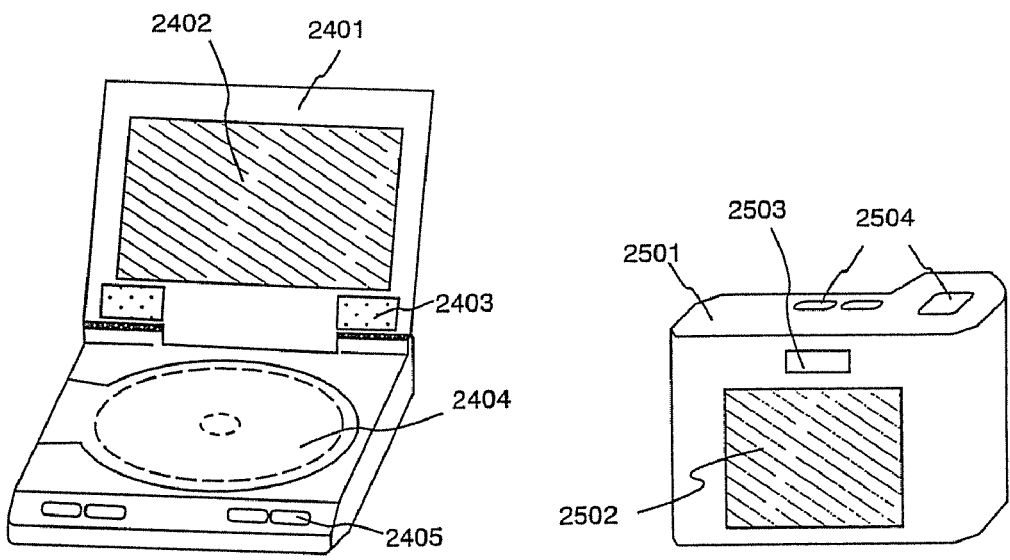
FIG. 25E
FIG. 25F

LIQUID CRYSTAL DISPLAY DEVICE HAVING PARTICULAR PIXEL ELECTRODES CONFIGURATION

This application is a divisional of U.S. application Ser. No. 11/015,160, filed on Dec. 17, 2004 now U.S. Pat. No. 7,554,642 which is a divisional of U.S. application Ser. No. 10/004,245, filed on Nov. 1, 2001 (now U.S. Pat. No. 7,167,226 issued Jan. 23, 2007).

BACKGROUND OF THE INVENTION

1. Field of the Invention

The present invention relates to a semiconductor device including a circuit composed of field effect transistors (FET) such as thin film transistors (TFT), and to a method for manufacturing the semiconductor device. The TFT means a semiconductor element including a semiconductor layer, a gate electrode, a source electrode and a drain electrode.

Here, the "element substrate" generally indicates the substrate having a semiconductor element such as the TFT.

Here, the "display device" generally indicates the device for displaying the brightness with the change in an electric signal, and the display device for displaying by applying the electric signal to a liquid crystal.

2. Related Art

In recent years, there has been noted a technique for constructing the TFT by using a semiconductor thin film (having a thickness of about several to several hundreds nm) formed over a substrate having an insulating surface. The TFT is widely applied to an electronic device such as an IC or a semiconductor device and is urgently demanded for a development as the switching element of the liquid crystal display device.

This liquid crystal display device is coarsely divided into two known kinds: the active matrix type and the passive matrix type. The liquid crystal display device of the active matrix type uses the TFT as the switching element and can achieve an image of a high quality. The general application of the active matrix type is a note-type personal computer but is expected as a home TV set or a mobile terminal.

Of the liquid crystal display device of the active matrix type, a liquid crystal display device of a projection type is enabled to achieve a large screen display by enlarging the frame to a screen. In the projection type liquid crystal display device of recent years, there has been developed the technique for making the liquid crystal display device mobile by reducing the size of the liquid crystal panel to reduce the size of the optical system. With this size reduction in the optical system, the cost for the optical system can be lowered to provide the liquid crystal display device at a reasonable cost.

Here, it is customary to subject the active matrix type liquid crystal display device to line inversion drives. Of these line inversion drives, the source line inversion drive is made such that the polarities of signal voltages to be written in pixel TFTs connected with m-columns of signal lines are different between the adjoining signal lines, as shown in a top plan view of the pixel portion of FIG. 30. For odd frames (FIG. 30A) and even frames (FIG. 30B), moreover, there are changed the polarities of the signal voltages to be written in the pixel TFT-s connected with signal lines. The liquid crystals are prevented from burning by changing the polarities of the signal voltages to be written in the pixel TFTs thereby to drive the liquid crystal with an AC current. The gate line inversion drive may be effected by replacing the signal lines of FIG. 30 by scanning lines.

An object of the present invention is to provide an active matrix type liquid crystal display device and an element structure which is enabled to prevent an optical leakage and a disclination by examining the principle of the disclination and the optical leakage of a liquid crystal systematically.

In the interface of an alignment film, the liquid crystal is oriented to raise its one end. The "pre-tilt direction" will be termed as the positive projection of the direction, as extended from one end of the liquid crystal molecule the closest to the interface of the alignment film to the other end raised from the alignment film, upon the substrate face. Moreover, the "pre-tilt angle" will be termed as the angle made between the interface of the alignment film and the longer axis of the liquid crystal near the interface of the alignment film. The pre-tilt angle is given by a rubbing treatment or by applying an electric field to the liquid crystal to switch the liquid crystal near the interface of the alignment film.

Moreover, the orientation failure, as caused by the fact that the direction of the pre-tilt of the near liquid crystal is generally opposed in the alignment film interface, will be called the "disclination". On the other hand, there is a region where the pre-tilt angle is locally different due to the electric field distribution or the heterogeneous rubbing although the pre-tilt direction of the liquid crystal is identical. The orientation failure, as thus caused when the orientation state is not normal, is that the brightness is locally so high when two polarization plates are arranged on the liquid crystal panel that the light looks as if it leaks. Therefore, the orientation of the liquid crystal, in which the direction of the pre-tilt is identical but the pre-tilt angle is locally different, will be called the "optical leakage".

When the liquid crystal display device is driven by the active matrix type, the display quality is degraded by the optical leakage and the disclination. In other words, in the normally white mode, a shielding film is required for shielding the optical leakage and the disclination so that the aperture ratio decreases.

In the liquid crystal display device having fine pixels as in the projection type liquid crystal display device, the disclination and the optical leakages, if any, will take an innegligible ratio in the pixels. If the optical leakage and the disclination cannot be shielded due to the misalignment of the shielding film, moreover, they are visually recognized like bright lines, when displayed in black, to lower the contrast. In short, it is important for the projection type liquid crystal display device how the optical leakage and the disclination are to be suppressed.

As compared with the smectic liquid crystal having a layer structure and accordingly a high orientation order, the nematic liquid crystal is easily subjected to the disclination and the optical leakage by the electric field established between pixel electrodes. Especially in the orientation system using the nematic liquid crystal, therefore, countermeasures are required for reducing the disclination and the optical leakage.

The reason why the optical leakage and the disclination occur will be described with reference to a schematic diagram presenting a section of the pixel portion of a liquid crystal display device of FIG. 12. In the adjoining pixel electrodes of FIG. 12, it is assumed that a pixel electrode 101a has a potential of +5 V whereas a pixel electrode 101b has a potential of −5 V. An opposed electrode 102 is assumed to have a potential of 0 V. In a region where equipotential lines 103 are formed in parallel with the surfaces of the pixel electrodes, the positive type liquid crystals are arranged such that their molecules 108 are normal at their longer axes to the surfaces of the pixel electrodes. At the ends of the pixel electrodes, however, the equipotential lines curve so that liquid crystal molecules 106 are oriented obliquely with respect to the surfaces of the pixel electrodes to cause the orientation failure. It is considered important for reducing the orientation failure how much the curvatures of the equipotential lines at the ends of the pixel electrodes are reduced.

At the ends of the pixel electrodes, there are formed regions 104 of the optical leakage in which the pre-tilt angle is locally different. This is because the equipotential lines curve at the end portions of the pixel electrodes so that the liquid crystal molecules 106 cannot be so switched at the end portions of the pixel electrodes as to have their longer axes normal to the surfaces of the pixel electrodes.

Moreover, there is formed a region where the pre-tilt direction of the liquid crystals is reversed by the electric field at the ends of the pixel electrodes from the pre-tilt direction determined by a rubbing direction 107. Then, the pre-tilt angle and the pre-tilt direction of the alignment film interface are locally abruptly changed to enlarge the orientation strain of the liquid crystals thereby to form regions 105 where the disclination occurs.

It is understood that the disclination and the optical leakage are caused from one reason that the equipotential lines parallel to the surfaces of the pixel electrodes curve at the end portions of the pixel electrodes. The present invention to be described in the following is so structurally devised that the curvatures of the equipotential lines are suppressed as much as possible and that the equipotential lines curve, if so, as close to the ends of the pixel electrodes as possible.

SUMMARY OF THE INVENTION

In order to solve the problems thus far described, there have been adopted the following means. The end portions of the pixel electrodes are classified into band-shaped first, second, third and fourth end portions. In the pixel electrode, moreover, the flat face, as enclosed by the first end portion, the second end portion, the third end portion and the fourth end portion, will be called the "main face" of the pixel electrode. Here, the end portion of the pixel electrode includes the ends of the pixel electrode, i.e., the portions extending in a band shape by several μm from the ends of the pixel electrode. The main face of the pixel electrode is a flat face occupying 20% or more, preferably 50% or more of the area of the pixel electrode. In short, the flat face occupying the maximum area of the pixel electrode is the main face of the pixel electrode.

One example of the pixel of the present invention will be described with reference to the top plan view of the pixel portion of the liquid crystal display device of FIG. 2. Of the end portions of a first pixel electrode 208 of the liquid-crystal display device for the gate line inversion drive, a first end portion 201 of the pixel electrode is extended along a first scanning line 207A. A third end portion 203 opposed to the first end portion 201 of the first pixel electrode is extended along a second scanning line 207B adjoining the first scanning line. A second end portion 202 is extended along a first signal line 212A. A fourth end portion 204 is extended along a second signal line 212B. The second signal line 212B is adjacent to the first signal line 212A. The two end portions 206A and 206B of the first end portion are extended at their one side along the first signal line 212A and the second signal line 212B, respectively. The two end portions 205A and 205B of the third end portion are extended at their one side along the first signal line 212A and the second signal line 212B, respectively.

The pixel electrodes adjoining first end portion 201 and the third end portion 203 are at the potential of polarity different from that of the first end portion and the third end portion. The pixel electrodes adjoining second end portion 202 and the fourth end portion 204 are at the potential of polarity identical to that of the first end portion and the third end portion. With reference to FIG. 2, in the liquid crystal display device for the gate line inversion drive, there is a second pixel electrode 209 which adjoins the first pixel electrode 208 across the first scanning line 207A. Then, there adjoin the first end portion 201 of the first pixel electrode 208 and the third end portion 203 of the second pixel electrode 209. At the pixel electrodes adjoining each other across the scanning line, between the first end portion of the first pixel electrode and the third end portion of the second pixel electrode, there is established an electric field as a result that the pixel electrodes having the potentials of different polarities adjoin each other.

In the liquid crystal display device for the source line inversion drive, it is sufficient to replace the first scanning line 207A of FIG. 2 by the first signal line and the second scanning line 207B by the second signal line. It is naturally necessary to replace the first signal line 212A by the first scanning line and the second signal line 212B by the second scanning line. In other words, the liquid crystal display device for the source line inversion drive, too, it is not different from the liquid crystal display device for the gate line inversion drive that the electric field is established between the first end portion of the first pixel electrode and the third end portion of the second pixel electrode as a result that the pixel electrodes of different polarities adjoin each other.

It can be thought that the optical leakage and the disclination can be reduced by suppressing the curvatures of the equipotential lines to be formed at the ends of the pixel electrodes. However, the degree of curvatures of the equipotential lines at the pixel electrode end portions changes depending upon whether the adjoining pixel electrodes are at identical or different polarities. Considering whether the adjoining pixel electrodes are at identical or different polarities, therefore, the countermeasures have been made for the following cases (1) and (2) by predicting it necessary to propose a structure for suppressing the curvatures of the equipotential lines.

[Ridges of Pixel Electrode End Portions]
(1) Adjoining Pixel Electrodes at Different Polarities It has been simulated how the orientation of the liquid crystal is changed by disposing the first end portion and the third end portion of the pixel electrode at a level close to the opposed electrode with respect to the main face of the pixel electrode. This simulation model is shown in FIG. 3. The simulation model of FIG. 3 presents a section of the pixel portion of the liquid crystal display device. The cell gap (d) indicates the distance from the surface of the opposed electrode to the main face of the pixel electrode. The distance (s) between the pixel electrodes indicates the distance, which is measured for the pixel electrodes adjoining in the direction parallel to the row direction of the display region from the end point of the pixel electrode to the end of the adjoining pixel electrode in the drawing, as formed by projecting the shape of the adjoining pixel electrodes positively on a plane contacting with the main face of the pixel electrode. For the pixel electrodes adjoining in the column direction, the distance is measured in the direction parallel to the column direction of the display region from the end point of the pixel electrode to the end point of the adjoining pixel electrode. The distance between the pixel electrodes may be locally different but is represented by the distance sharing the maximum ratio in the distribution of the distances between the pixel electrodes. If the liquid crystal display device for the gate line inversion drive is assumed, the distance between the pixel electrodes in the present simulation is the distance (s) between the first pixel electrode 208 and the second pixel electrode 209 in the top plan view of FIG. 2.

In FIG. 3, the individual electrodes have the following potentials: a first pixel electrode 303a at +5 V; a second pixel electrode 303b at −5 V; and an opposed electrode 301 at 0 V. A liquid crystal 302 is exemplified by ZLI4792 made by MERK Company, and has a pre-tilt angle of 6.0 degrees, a sinistrous chiral pitch of 70 μm and a twist angle of 90 degrees. The pixel pitch (p) is 18 μm. The distance (s) between the first pixel electrode and the second pixel electrode is 2.0 μm. The cell gap (d) is 4.5 μm. It is assumed that the pixel electrode and the opposed electrode are formed over a transparent substrate 307. The structure is made by repeating the units of the simulation model of FIG. 3 periodically. In FIG. 3, there are shown rubbing directions 305 and 306. The simulation software used was LCD Master of SHINTEC Company.

Moreover, the simulation was done by using the presence and absence of a ridge 304 and the width ($L_1$) of the first end portion as parameters. The first end portion and the third end portion are formed to rise from the flat face. The overlapping widths between the ridge and the pixel electrode, i.e., the width ($L_1$) of the first end portion and the width ($L_2$) of the third end portion are the shortest length from each point of the end of the pixel electrode to the side opposed to that point, in a polygon which is formed by projecting the portions raised from the main face of the pixel electrode, positively on the face to contact with the main face of the pixel electrode. Here in the construction having the end portions of the pixel electrode on the ridge, the height of the first end portion is the distance between the face to contact with the main face of the pixel electrode and the uppermost end portion of the first end portion. The height of the third end portion is the distance between the face to contact with the main face of the pixel electrode and the uppermost end portion of the third end portion. The heights (h) of the first end portion and the third end portion are set to 0.5 μm in the simulation. In this simulation, the width ($L_1$) of the first end portion and the width ($L_2$) of the third end portion are equalized. Moreover, the heights (h) of the first end portion and the third end portion are also equalized.

Under the conditions of the simulations, there adjoin the first pixel electrode 303a and the second pixel electrode 303b which have potentials of polarities different from each other. In the liquid crystal display device for the gate line inversion drive, specifically, the model of FIG. 3 indicates that the first pixel electrode 303a and the second pixel electrode 303b adjoining the former in the column direction have the potentials of polarities different from each other, and that a first end portion 1001 of the first pixel electrode and a third end portion 1002 of the second pixel electrode adjoin each other.

In the liquid crystal display device for the source line inversion drive, specifically, the model indicates that the first pixel electrode 303a and the second pixel electrode 303b adjoining the former in the row direction have the potentials of polarities different from each other, and that the first end portion 1001 of the first pixel electrode and the third end portion 1002 of the second pixel electrode adjoin each other.

The results of the representative simulations presenting the characteristics are shown in FIG. 13 and FIG. 14. FIG. 13 and FIG. 14 present relations between the width and transmittance of the pixel electrode overlapping the ridge. FIG. 13A shows the case in which the pixel electrode is formed on the flat face; FIG. 13B shows the case in which the ends (i.e., the first end portion and the third end portion) of the pixel electrode are formed over the ridge by 1.4 μm; and FIG. 14 shows the case in which the ends (i.e., the first end portion and the third end portion) of the pixel electrode are formed over the ridge by 4.0 μm. It is indicated that the better black display is realized for the lower transmittance. The results of the simulation show the pixel electrode, the opposed electrode, and the director of the liquid crystal, the equipotential lines and the transmittance. In the actual simulation, the pixel electrode is disposed at the portion of a scale of 1 μm to 16 μm of the abscissa, and the pixel electrode is disposed at the portion of a scale of 19 μm to 35 μm of the abscissa. Moreover, the pixel electrodes adjoin each other at a gap of 2 μm. Because the disclination and the optical leakage at the portions of the ends of the pixel electrode are noted, however, the portion of the scale of 10 μm to 26 μm of the abscissa is shown in an enlarged scale in FIG. 13 and FIG. 14. If the pixel electrode is on the flat face, as shown in FIG. 13A, the equipotential lines curve at the end portions of the pixel electrode. When the first end portion of the first pixel electrode and the third end portion of the second pixel electrode are, disposed at a height as high as the opposed electrode, as compared with the main face of the pixel electrode, as shown in FIG. 13B, however, the equipotential lines are formed along the surface of the pixel electrodes in the vicinity of the first end portion of the first pixel electrode and the third end portion of the second pixel electrode. Therefore, the curvatures of the equipotential lines in the vicinity of the first end portion of the first pixel electrode and the third end portion of the second pixel electrode are slightly suppressed to reductions in the disclination and the optical leakage. If the widths of the first end portion and the third end portion are enlarged, as shown in FIG. 14, however, even the equipotential lines having been intrinsically parallel to the flat face having the first pixel electrode and the third pixel electrode are curved toward the opposed electrode due to the first end portion and the third end portion, as raised with respect to the main face of the pixel electrode, so that the disclination and the optical leakage increase. In short, it has been understood that when the adjoining pixel electrode have the potentials of the different polarities, the first end portion of the first pixel electrode and the third end portion of the second pixel electrode are preferably raised from the main face of the pixel electrode and disposed at a high as the opposed electrode, but that the width of the first end portion and the width of the third end portion have the optimum values for reducing the optical leakage and the disclination.

The results of FIG. 13 and FIG. 14 will be summarized with specific numeral values. The sum of the widths of the optical leakage and the disclination is designated by x (μm).

When the pixel electrodes are on the flat face, as shown in FIG. 13A, x=9.2 μm;

When the first end portion of the first pixel electrode has a width of 1.4 μm and when the third end portion of the second pixel electrode has a width of 1.4 μm, as shown in FIG. 13B, x=6.8 μm; and When the first end portion of the first pixel electrode has a width of 4.0 μm and when the third end portion of the second pixel electrode has a width of 4.0 μm, as shown in FIG. 14, x=9.3 μm.

By comparing these three simulation results, the effect to suppress the optical leakage and the disclination is high when the first end portion and the third end portion have the width of 1.4 μm.

The results of simulations, as made by changing the relations between the width ($L_1$) of the first end portion and the sum (x) of the widths of the optical leakage and the disclination for the cell gap (d), the height (h) of the first end portion, the distance (s) between the first pixel electrode and the second pixel electrode and the pitch (p) of the pixels, are shown in FIG. 11. In FIG. 11, the abscissa indicates the overlap width (i.e., the width of the first end portion) of the pixel electrode and the ridge, and the ordinate indicates the sum of the widths of the optical leakage and the disclination. It is indicated that the quality of the black display is the better for the less sum of the widths of the optical leakage and the disclination. The simulations are made with the height of the first end portion 1001 and the height of the third end portion 1002 being equal. It is indicated that if the height of the first end portion is 0.5 μm, the height of the third end portion is necessarily 0.5 μm. In the simulations, moreover, the width ($L_1$) of the first end portion and the width ($L_2$) of the second pixel electrode are equalized. It is, therefore, indicated that if the width of the first end portion is 0.5 μm, the width of the third end portion is necessarily 0.5 μm.

If the heights of the first end portion and the third end portion are small, the effect to suppress the disclination and the optical leakage tends to be low, and it is, therefore, preferable that the heights of the first end portion and the third end portion are 0.5 μm or more. When the heights of the first end portion and the third end portion are 0.5 μm or more, the cell gap is 4.5 μm or less. It is also understood that the sum of the widths of the optical leakage and the disclination becomes more than that without the first end portion and the third end portion for the distance of 4.0 μm or less between the pixel electrodes, unless the width of the first end portion and the width of the third end portion are suppressed within 3.0 μm from the ends of the pixel electrode.

By comparing FIG. 11A and FIG. 11B, it is understood that the effect obtained by raising the first end portion and the third end portion with respect to the main face of the pixel electrode to the height nearly that of the opposed electrode appears the more prominent especially as the cell gap becomes the larger. If the cell gap is large, the electric field to be established between the opposed electrode and the pixel electrode is weak so that the equipotential lines are liable to curve at the end portions of the pixel electrode. Thus, it is understood that when the curvatures of the equipotential lines are large at the end portions of the pixel electrode, the curvatures of the equipotential lines are effectively suppressed by raising the first end portion and the third end portion with respect to the main face of the pixel electrode.

Moreover, the simulations are further made by changing the pixel pitch (p). For the pixel of a pitch of 18 μm and the pixel of a pitch of 43 μm, however, the degrees of the optical leakage and the disclination are not largely changed. This is because the disclination and the optical leakage are the phenomenon to occur at the end portions of the pixel electrode (FIG. 11A).

(2) Adjoining Pixel Electrodes at Identical Polarities

In the liquid crystal display device of the gate line inversion drive in a top plan view of a pixel portion in FIG. 2, of the end portions of the pixel electrode, the fourth end portion 204 of the first pixel electrode 208 adjoins the second end portion 202 of a third pixel electrode 210, as having the potential of the identical polarity. Therefore, here will be detailed how to make the structures of the second end portion and the fourth end portion having the potentials of the identical polarity and adjoining each other.

This description will be described with reference to FIG. 2. In the liquid crystal display device for the gate line inversion drive, when the pixel electrodes adjoining across the signal line 212B are at the potentials of the identical polarity, the changes in the orientation of the liquid crystal are compared between the cases, in which for the second end portion 202 of the third pixel electrode 210 and the fourth end portion 204 of the first pixel electrode 208, the second end portion and the fourth end portion are raised with respect to the main face of the pixel electrode so that they are formed to the same level nearly that of the opposed electrode and to the flat face.

In the simulation model of FIG. 3, it is assumed that the pixel electrode adjoining the first end portion 303a is the third pixel electrode 303b. It is also assumed that the width ($L_1$) of the second end portion and the width ($L_2$) of the fourth end portion are equalized.

The simulation conditions are identical to those of (1) "the ridges of the pixel electrode end portions" excepting that both the first pixel electrode 303a and the third pixel electrode 303b have the potential of +5 V. Specifically, the potential of the opposed electrode is 0 V, and the distance (s) between the first pixel electrode 303a and the third pixel electrode 303b is 2.0 μm. The height (h) of the second end portion and the height (h) of the fourth end portion are 0.5 μm. The cell gap (d) is 4.5 μm. The physical properties of the liquid crystal of the simulation use the data of ZLI4792 at the room temperature. The pre-tilt angle and the twist angle of the liquid crystal are 6 degrees and 90 degrees, and the rubbing directions are indicated by 305 and 306.

The results of the simulation are shown in FIGS. 15 and 16. FIGS. 15 and 16 show the changes in the transmittance against the overlap width of the pixel electrode and the ridge when the pixel electrodes having the potentials of the identical polarity adjoin each other. It is indicated that the more excellent black display is made for the lower transmittance. FIG. 15A shows the case in which the pixel electrodes are formed on the flat face; FIG. 15B shows the case in which the ends (i.e., the first end portion and the third end portion) of the pixel electrode are formed over the ridge by 1.4 μm; and FIG. 16 shows the case in which the ends (i.e., the first end portion and the third end portion) of the pixel electrode are formed over the ridge by 4.0 μm. In the actual simulation, the pixel electrode is disposed at the portion of a scale of 1 μm to 16 μm of the abscissa, and the pixel electrode is disposed at the portion of a scale of 19 μm to 35 μm of the abscissa. Moreover, the pixel electrodes adjoin each other at a gap of 2 μm. Because the disclination and the optical leakage at the portions of the ends of the pixel electrode are noted, however, the portion of the scale of 10 μm to 26 μm of the abscissa is shown in an enlarged scale in FIG. 15 and FIG. 16. The results of FIG. 15 and FIG. 16 will be summarized with specific numeral values. The magnitude of the optical leakage is indicated by the maximum (%) of the transmittance. Here is not the disclination which might otherwise be caused by reversing the pre-tilt direction at the interface of the alignment film.

When the pixel electrodes are on the flat face, as shown in FIG. 15A, the transmittance of the optical leakage has a maximum of 0.3%;

When the second end portion of the first pixel electrode has a width of 1.4 μm and when the fourth end portion of the third pixel electrode has a width of 1.4 μm, as shown in FIG. 15B the transmittance of the optical leakage has a maximum of 1.0%; and When the second end portion of the first pixel electrode has a width of 4.0 μm and when the fourth end portion of the third pixel electrode has a width of 4.0 μm, as shown in FIG. 16 the transmittance of the optical leakage has a maximum of 1.0%.

When the adjoining pixel electrodes are at the potentials of the identical polarity, the equipotential lines are formed generally in parallel with the flat face in which the pixel electrodes are formed. It is in the region between the pixel electrodes where the equipotential lines curve. Without the ridge below the second end portion and the fourth end portion of the pixel electrode, therefore, the optical leakage is little, if any (FIG. 15A). Moreover, when the second end portion and the fourth end portion of the pixel electrode are raised with respect to the main face of the pixel electrode to the height nearly that of the opposed electrode, the equipotential lines, as intrinsically parallel to the flat face having the pixel electrode, are curved by the ridge so that the optical leakage occurs at the portions corresponding to the two ends of the ridge (FIG. 15B). As the second end portion and the fourth end portion become the wider so that the two ends of the ridge become the closer to the inside of the pixel electrode, the optical leakages at the two ends of the ridge occur on the inner side of the pixel electrode so that the shielding film for shielding the optical leakage is required to have the larger width (FIG. 16). When the pixel electrodes adjoining each other are at the potentials of the identical polarity, therefore, it has been understood that the better liquid crystal orientation can be obtained if the second end portion and the fourth end portion of the pixel electrode are at the same height as that of the main face of the pixel electrode. In other words, a slight optical leakage occurs at the second end portion and the fourth end portion of the pixel electrode, too, when the adjoining pixel electrodes are at the identical polarity. However, it is predicted that the countermeasure of raising the end portions of the pixel electrode results in adverse effects.

The simulation of FIGS. 17 and 18 corresponds to the case in which the pixel electrodes having the equal potentials adjoin each other, and examines the changes in the transmittance by changing the distance between the pixel electrodes. The tendencies are examined by changing the distance between the pixel electrodes to 2.0 μm, 4.0 μm and 6.0 μm.

From the simulation of FIG. 17 and FIG. 18, it is understood that the curvatures of the equipotential lines are the less for the shorter distance between the first pixel electrode and the third pixel electrode when the pixel electrodes adjoin each other at the equal potential. FIG. 17 and FIG. 18 show the orientation of the liquid crystal when the first pixel electrode and the third pixel electrode adjoining are at +5 V of the identical polarity and when the opposed electrode is at 0 V. The liquid crystal used is ZLI4792. The pixel electrodes are formed on the flat face. FIG. 17A shows the orientation of the liquid crystal at the time when the distance between the pixel electrodes is 2.0 μm. FIG. 17B shows the orientation of the liquid crystal at the time when the distance between the pixel electrodes is 4.0 μm. FIG. 18 shows the orientation of the liquid crystal at the time when the distance between the pixel electrodes is 6.0 μm.

If the distance between the adjoining pixel electrodes of the identical polarity is 2.0 μm or less, as shown in FIG. 17 and FIG. 18, it is understood that the curvatures of the equipotential lines are not so large. When the distance between the pixel electrodes is 2.0 μm or less, therefore, it is predicted that the formation of the second end portion and the fourth end portion of the pixel electrode rising with respect to the main face of the pixel electrode is adversely effective for the orientation of the liquid crystal. If the second end portion of the pixel electrode and the fourth end portion of the pixel electrode are at the same height as that of the main face of the pixel electrode, the equipotential lines can be made more parallel to the face having the pixel electrodes to improve the orientation of the liquid crystal better.

[Construction 1 of Pixel Portion of Invention]

On the basis of the analyses thus far made, the features of the present invention will be described with reference to FIGS. 1 and 2 and FIG. 4. FIG. 1A shows a top plan view of the pixel electrode, and FIG. 1B shows a perspective view of the pixel electrodes arranged in a matrix shape. The top plan view of FIG. 2 shows the positional relations between the signal lines and the scanning lines and the first to fourth end portions of the pixel electrodes when the pixel electrodes shown in FIG. 1A are arranged in the 2×2 matrix. The sections, as taken along the chain lines A-A' and B-B' from FIG. 2, are presented in FIGS. 4A and 4B. The chain lines A-A' and B-B', as presented in the perspective view of the pixel electrode of FIG. 1B, correspond to the top plan view of FIG. 2 and the sectional view of FIG. 4.

The characteristics of the pixel portion of the present invention will be described with reference to FIG. 2. The pixel electrode includes the first end portion 201, the second end portion 202, the third end portion 203 and the fourth end portion 204, and its main face surrounding by those end portions, and the main face is formed over the flat face. Moreover, the pixel electrode further includes the opposed electrode opposed to the pixel electrode. The first end portion is extended along the first scanning line 207A; the third end portion is extended along the second scanning line 207B adjoining the first scanning line 207A; the second end portion is extended along the first signal line 212A; and the fourth end portion is extended along the second signal line 212B adjoining the first signal line 212A. The two end portions 206A and 206B of the first end portion 201 are extended along the first signal line 212A and the second signal line 212B. The two end portions 205A and 205B of the third end portion 203 are extended along the first signal line 212A and the second signal line 212B. Moreover, the first end portion and the third end portion are formed to have a height nearly that of the opposed electrode with respect to the flat face, and the second end portion and the fourth end portion are formed to have a height nearly that of the flat face. The present invention can be applied to the liquid crystal display device for the gate line inversion drive.

Moreover, the liquid crystal display device for the gate line inversion drive is characterized in that the pixel electrode includes the first pixel electrode 208 and the second pixel electrode 209 adjoining the first pixel electrode in the column direction, and in that the first end portion 201 of the first pixel electrode 208 and the third end portion 203 of the second pixel electrode adjoin each other. This will be described with reference to the perspective view of FIG. 1B. Over a scanning line 213, there are the first end portion in the first pixel electrode 208 and the third end portion in the second pixel electrode 209. The second end portion and the fourth end portion in the first pixel electrode to the fourth pixel electrode are at the same height as that of the main face of the pixel electrodes.

Specifically, for the gate line inversion drive, the first pixel electrode 208 and the second pixel electrode 209, as opposed to each other across the first scanning line 207A, as shown in FIG. 2, have the potentials of polarities different from each other. By forming the first end portion 201 in the first pixel electrode 208 and the third end portion in the second pixel electrode at a height nearly that of the opposed electrode, the curvatures of the equipotential lines are suppressed at the first end portion 201 in the first pixel electrode 208 and at the third end portion 203 in the second pixel electrode 209 thereby to reduce the disclination and the optical leakage effectively (as referred to (1) "the ridges of the pixel electrode end portions"). The second end portion 202 in the first pixel electrode 208 and the fourth end portion 204 in the first pixel electrode are formed on the flat face. The fourth end portion 204 in the first pixel electrode 208 and the second end portion 202 in the third pixel electrode 210 have the potentials of the identical polarity and adjoin each other. It is, the more effective for suppressing the unnecessary curvatures of the equipotential lines and accordingly the disclination and the optical leakage, that the second end portion of the first pixel electrode and the fourth end portion of the third pixel electrode, that is, the end portions of the adjoining pixel electrodes at the identical polarity are disposed on the flat face. This effect is remarkable especially when the distance between the first pixel electrode and the third pixel electrode is 2.0 µm or less (as referred to (2) "the ridges of the pixel electrode end portions").

In the present invention, moreover, the height of the first end portion and the third end portion are desired to be 0.5 µm or more with respect to the main face of the pixel electrode. In other words, the height of the first end portion and the third end portion is desired to be 0.5 µm or closer to the opposed electrode with respect to the main face of the pixel electrode. At this time, the width ($L_1$) of the first end portion and the width ($L_2$) of the third end portion, as shown in FIG. 1A, have the optimum value, so that the effect to reduce the disclination and the optical leakage cannot be obtained if the optimum value is exceeded. Unless the widths of the first end portion and the second end portion are suppressed within 3.0 µm from the end of the pixel electrode for the cell gap of 4.5 µm or less and for the distance of 4.0 µm between the first pixel electrode and the second pixel electrode, the sum of the widths for the optical leakage and the disclination becomes larger than that of the case in which the first end portion and the third end portion are formed to have the same height as that of the main face of the pixel electrode. This fact has been described by using the graphs of FIG. 11 showing the relations between the overlap width (i.e., the width of the first end portion) of the pixel electrode and the ridge and the sum of the widths for the optical leakage and the disclination (as referred to (2) "the ridges of the pixel electrode end portions").

In the sectional view of FIG. 4A showing the end portions of the adjoining pixel electrodes having the potentials of the different polarities, there are located the width ($L_1$) of the first end portion, the width ($L_2$) of the third end portion, the height of the first end portion and the height (h) of the third end portion. The first end portion 201 and the third end portion 203 rise with respect to the main face of the pixel electrode and are located at a height close to the opposed electrode. In the sectional view of FIG. 4B showing the end portions of the adjoining pixel electrodes having the potentials of the identical potential, it is shown that the second end portion 202 and the fourth end portion 204 are formed on the flat face.

In the liquid crystal display device for the source line inversion drive, the positional relations of the end portions of the pixel electrode may be thought by replacing the first signal line 212A of FIG. 2 and FIG. 1B by the first scanning line and the second signal line 212B by the second scanning line. Naturally, the first scanning line 207A is replaced by the first signal line, and the second scanning line 207B is replaced by the second signal line.

Specifically, according to the present invention, the liquid crystal display device for the source line inversion drive is characterized: the pixel electrode includes the band-shaped first, second, third and fourth end portions and the main face surrounded by these end portions; in that the main face is formed on the flat face; in that there is further included the opposed electrode opposed to the pixel electrode; in that the first end portion is extended along the first signal line, the third end portion is extended along the second signal line adjoining the first signal line, the second end portion is extended along the first scanning line, and the fourth end portion is extended along the second scanning line adjoining the first scanning line; in that the first end portion and the third end portion are extended at their two end portions along the first scanning line and the second scanning line; in that the first end portion and the third end portion are nearly as high as the opposed electrode with respect to the flat face; and in that the second end portion and the fourth end portion are at the same height as that of the flat face.

Moreover, the liquid crystal display device is characterized: in that the pixel electrode includes the first pixel electrode and the second pixel electrode adjoining the former in the row direction; and in that the first end portion of the first pixel electrode and the third end portion of the second pixel electrode adjoin each other.

Moreover, the liquid crystal display device is characterized: in that the first end portion and the third end portion are disposed at a height of 0.5 µm or closer to the opposed electrode; and in that the width of the first end portion and the width of the third end portion are 3.0 µm or less from the end of the pixel electrode, when the liquid crystal display device has a cell gap of 4.5 µm or less and when the distance between the first pixel electrode and the second pixel electrode is 4.0 µm or less.

In the ordinary liquid crystal display device of the active matrix type, the pixel electrode is mostly formed over the scanning lines and the signal lines. Therefore, the end portions of the pixel electrode are necessarily formed mostly to rise with respect to the main face of the pixel electrode to a height close to the opposed electrode. However, the effect to reduce the disclination and the optical leakage is not obtained merely by raising the end portions of the pixel electrode with respect to the main face of the pixel electrode. It is assumed, for example, that the portions of the end portions of the pixel electrode over a scanning line 3005 and the (not-shown) signal line rise with respect to the main face of the pixel electrode, as shown in a perspective view of the pixel electrodes arranged in a matrix shape in FIG. 31A. With this simple construction, the disclination and the optical leakage, as caused generally in parallel with the scanning line 3005 when in the gate line inversion drive, for example, are suppressed because the end portions of the pixel electrodes rise with respect to the main face of the pixel electrodes. However, the end portion 3010 of a pixel electrode 3006 and the end portion of a pixel electrode 3008, as adjoining each other in the identical polarity, rise with respect to the main face of the pixel electrodes so that the disclination and the optical leakage will occur in parallel with the signal line of the pixel electrodes.

When the pixel TFTs to be connected with the pixel electrodes are to be constructed, the end portions of the pixel electrodes may be locally raised by the thicknesses of the storage capacities and the semiconductor layers connected in series with the pixel TFTs, as shown in the perspective view of the pixel electrodes arranged in the matrix shape in FIG. 31B. However, the mere rises of the end portions of the pixel electrodes, as locally caused merely by the thicknesses of the storage capacities with respect to the main face of the pixel electrodes, could not attain the effect to reduce the disclination and the optical leakage. In the liquid crystal display device for the source line inversion drive, for example, it is nonsense to raise the end portions of the pixel electrodes along the scanning line 3005 with respect to the main face of the pixel electrodes. Specifically, in dependence upon the gate line inversion drive or the source line inversion drive of the liquid crystal display device, it is necessary to select whether the portions rising from the main face of the pixel electrode, such as the first end portion and the third end portion, are to be formed along the scanning line or the signal line. As shown in the top plan view of the pixel electrodes of FIG. 1A, especially, the two end portions 206A and 206B of the first end portion 201 and the two end portions 205A and 205B of the third end portion of the pixel electrode, as contacting with the pixel electrode of the different polarity and having the easily curving equipotential lines, have to be raised with respect to the main face of the pixel electrode to a height close to the opposed electrode. The construction of the perspective view of FIG. 31B cannot suppress the optical leakage and the disclination, as might otherwise occur at the end portion 3012 of the pixel electrode.

In short, the construction of the pixel portion of the present invention has the structure, which has been decided by considering the potentials of the adjoining pixel electrodes and the equipotential lines caused by the structure of the pixel electrodes, but is not absolutely different from the structure which is necessarily made. Moreover, the structure is obtained by examining how to establish the equipotential lines systematically by the simulation so that it should be highly appreciated in its effects, as compared with the method of the prior art for reducing the disclination and the optical leakage.

In the simulation, as shown in FIG. 3, the section of the ridge 304 below the first end portion and the third end portion of the pixel electrode is formed into a rectangular shape. However, the present invention can also be applied to the simulation model of FIG. 3, in which the angle (as will be called the "taper angle of the ridge"), as made between the side face of the ridge and the face contacting with the main face of the pixel electrode is 90 degrees or less. Where the taper angle of the ridge 304 is less than 90 degrees in the sectional view of FIG. 5A showing the end portion of the pixel electrode, the abrupt change in the electric field in the vicinity of the crests of the ridge can be suppressed, as compared with the structure in which the ridge has the rectangular section. Then, the electric field abruptly changes at the crests of the rectangular ridge, as resulted by the simulation of FIG. 15B, so that the phenomenon of the locally high transmittance can be preferably prevented. Similar discussions apply to the case in which the section of the ridge is curved, as shown in the top plan view of the end portions of the pixel electrode in FIG. 5B. Thus, even when the section of the ridge below the first end portion and the third end portion of the pixel electrode is not rectangular, on the contrary, it is predicted that the optical leakage and the disclination are not increased by the first end portion and the third end portion, if the width ($L_1$) of the first end portion and the width ($L_2$) of the third end portion of the pixel electrode are suppressed within 3.0 μm, when the first end portion and the third end portion have a height (h) of 0.5 μm or more, when the cell gap is 4.5 μm or less and when the distance (s) between the pixel electrodes is 4.0 μm or less. Here, the width ($L_1$) of the first end portion and the width ($L_2$) of the third end portion are applied to the portions of the pixel electrode, which rise locally with respect to the main face of the pixel electrode.

[Construction 2 of Pixel Portion of the Invention]

Here will be described the construction of the pixel portion of the present invention. A comparison is made between the simulation results having examined how the optical leakage and the disclination occurred depending upon whether the adjoining pixel electrodes of FIG. 13 to FIG. 16 have the potentials of the identical or different polarities. It is thought better that the height of the end portions of the pixel electrode is locally increased where the equipotential lines make large curvatures, so as to suppress the curvatures of the equipotential lines of the pixel electrode end portions.

However, how much the end portions of the pixel electrode are to be raised with respect to the main face of the pixel electrode has to be determined on the basis of the curving degree of the equipotential lines formed by the pixel electrodes adjoining each other. This could be understood by comparing the simulation results of FIG. 13 to FIG. 16. Specifically, if the heights of the end portions of the pixel electrode are carelessly increased nearly to that of the opposed electrode even with little curvature of the equipotential lines, this determination will increase the disclination and the optical leakage (FIG. 15 and FIG. 16). When the equipotential lines prominently curve at the end portions of the pixel electrode, however, the end portions of the pixel electrode are raised with respect to the main face of the pixel electrode to a height close to the opposed electrode (FIG. 13 and FIG. 14).

If this concept is developed, moreover, the heights of the end portions of the pixel electrode may be made the larger for the more intense curvatures of the equipotential lines at the end portions of the pixel electrode. In short, it is effective for preventing the optical leakage and the disclination to determine the heights of the end portions of the pixel electrode in accordance with the curving degree of the equipotential lines.

The description will be made with reference to the top plan view of the pixel electrode of FIG. 6A. In the case of a rectangular pixel electrode 258, the intense curvatures of the equipotential lines are specified to occur at the vicinities 255A and 255B, and 256A and 256B to the crests of the pixel electrode. At these vicinities 255A and 255B, and 256A and 256B of the crests of the pixel electrodes close to the two pixel electrodes having the potentials of the different polarities, these equipotential lines are intensely curved by the influences of the pixel electrodes having the potentials of the different polarities. In the rectangular pixel electrodes, the vicinities of the crests of the pixel electrode, e.g., the two end portions 256A and 256B of a first end portion 251 may be raised with respect to the central portion 263 of the first end portion 251 of the pixel electrode. Moreover, the two end portions 255A and 255B of a third end portion 253 of the pixel electrode are locally raised with respect to the central portion of the third end portion 253. Here, the central portion of the first end portion is located at a position bisecting a segment which is formed of two points: one point (A) on the end of the pixel electrode, as contained in the two end portions 256A of the first end portion; and an intersection point (B) between the straight line extending from that point (A) in parallel with the row direction of the pixels and the other of the two end portions 256B of the first end portion. The central portion of the third end portion can be defined if the description thus far made is changed from the first end portion to the third end portion.

The characteristics of the pixel electrode of the present invention will be described with reference to the top plan view of the pixel portion of FIG. 7, in which the pixel electrodes are, arranged in the matrix shape. The first to fourth pixel electrodes 258 to 261 are shown in a matrix of 2×2. For the gate line inversion drive, the pixel electrodes having the potentials of polarities different from that of the first pixel electrode 258 are the second pixel electrode 259 and the fourth pixel electrode 261. Specifically, one 256A of the two end portions 256A and 256B of the first end portion 251 of the first pixel electrode adjoins the second pixel electrode 259 and the fourth pixel electrode 261 having the potentials of the polarity different from that of the first pixel electrode. Then, the equipotential lines are intensely curved at the two end portions 256A of the first end portion of the first pixel electrode by the influences of the electric field which is established by the second pixel electrode and the fourth pixel electrode and by the two end portions 256A of the first end portion of the first pixel electrode.

Of the first to fourth pixel electrodes shown in the top plan view of FIG. 7, therefore, the portions close to the two pixel electrodes having the polarities of the different polarities, such as the two end portions 256A and 256B of the first end portion and the two end portions 255A and 255B of the third end portion are desired to be locally raised. Specifically, if the heights of the end portions of the pixel electrode are determined according to the curving degree of the equipotential lines at the pixel electrode end portions, the two end portions of the first end portion and the two end portions of the third end portion have large curvatures of the equipotential lines so that they necessarily have to be raised with respect to the main face of the pixel electrode. In other words, it is necessary to set the two end portions of the first end portion and the two end portions of the third end portion at positions close to the opposed electrode.

For example, the liquid crystal display device for the gate line inversion drive may be given a structure in which the two end portions of the first end portion and the third end portion, as located close to the scanning line 263, of the end portions of the pixel electrode are locally raised, as shown in the perspective view of FIG. 6B showing the pixel electrodes arranged in the matrix shape.

With reference to FIG. 7, the liquid crystal display device for the gate line inversion drive according to the present invention is constructed such that the pixel electrode includes the band shaped first end portion 251, second end portion 252, third end portion 253 and fourth end portion 254, and the main face enclosed by those end portions. This main face is formed over the flat face and has the opposed electrode opposed to the pixel electrode. Moreover, the first end portion is extended along the first scanning line 257A; the third end portion is extended along a second scanning line 257B adjoining the first scanning line; the second end portion is extended along a first signal line 262A; and the fourth end portion is extended along a second signal line 262B adjoining the first signal line. The two end portions 255A and 255B, and 256A and 256B of the first end portion and the third end portion are extended along the first signal line and the second signal line. The first end portion and the third end portion are disposed at a height close to the opposed electrode with respect to the flat face, and the second end portion and the fourth end portion are disposed at the height equal to that of the flat face.

In this liquid crystal display device, moreover, the present invention is characterized in that the two end portions of the first end portion are disposed at a height closer to the opposed electrode than the central portion of the first end portion, and in that the two end portions of the third end portion are disposed at a height closer to the opposed electrode than the central portion of the third end portion.

Specifically, the present invention is characterized in that the two end portions of the first end portion are disposed at a height closer by a significant different of 0.2 μm or closer to the opposed electrode than the central portion of the first end portion, and in that the two end portions of the third end portion are disposed at a height closer by 0.2 μm or closer to the opposed electrode than the central portion of the third end portion.

Alternatively, the present invention is characterized in that the two end portions of the first end portion are disposed at a height closer by a significant different of 0.5 μm or closer to the opposed electrode than the central portion of the first end portion, and in that the two end portions of the third end portion are disposed at a height closer by 0.5 μm or closer to the opposed electrode than the central portion of the third end portion.

If the pixel electrode rises into a ridge shape by 0.2 μm or more, or 0.5 μm or more, there is a significant effect to change how the equipotential lines are established to change the orientation of the liquid crystal, as seen from the graphs showing the results of the simulation as shown in FIG. 11.

FIGS. 8A and 8B present the sectional views of the pixel electrode, as taken along chain lines C-C' and D-D' from the top-plan view of FIG. 7. In FIG. 8B, there are defined the height (h1) of the first end portion and the third end portion of the pixel electrode 261, and the width ($L_1$) of the first end portion. Here, the fact that the first end portion has the height h1, namely, that the distance between the face contacting with the main face of the pixel electrode and the uppermost end portion of the first end portion is h1 will mean that the first end portion of the pixel electrode is at a height close by h1 to the opposed electrode. As shown in FIG. 8A, the two end portions of the first end portion of the pixel electrode 259 are raised to a height h2 with respect to the central portion of the first end portion. Here, the fact that the distance between the face contacting with the central portion of the first end portion and the uppermost end portion of the two end portions of the first end portion is h2 will mean that the two end portions of the first end portion are disposed at a height closer by h2 to the opposed electrode than the central portion.

In the liquid crystal display device for the source line inversion drive, it is sufficient to replace the scanning lines by the signal lines and the signal lines by the scanning lines.

[Example of Application Range of the Invention]

The structure of the pixel portion thus made according to the present invention is that the lines of electric power when the electric field is applied are normal to the formed flat face of the pixel electrode, so that it can be widely used as means for reducing the orientation failure of the liquid crystal for both the orientation systems of the normally white mode and the normally black mode.

If the orientation of the liquid crystal is not induced by the corrugations, moreover, the present invention can be applied to the orientation system using the smectic liquid crystal. For example, the present invention can be applied to the liquid crystal display device using a ferro-electric liquid crystal or an anti-ferro-electric liquid crystal. Moreover, the present invention can also be applied to the liquid crystal display device using the material which has been set by adding a liquid polymer to the smectic liquid crystal and by irradiating it with a beam (e.g., an ultraviolet ray).

The construction of the pixel portion of the present invention can be widely used as the means for adjusting the electric field distribution in the display device in which the optical modulation layer is optically modulated by applying a voltage thereto by a semiconductor element.

Especially in the projection type liquid crystal display device, the optical leakage and the disclination are enlarged by the optical system using lenses and are projected on the screen. Therefore, the present invention is effective especially in the projection type liquid crystal display device.

The first end portion, the second end portion, the third end portion and the fourth end portion of the present invention need not be rectangular, as shown in the top plan views. These end portions may be freely designed on the basis of the concept in which the portions of the equipotential lines to curve intensely at the time of driving the liquid crystal display device are raised at the end portions of the pixel electrode than the main face of the pixel electrode.

BRIEF DESCRIPTION OF THE DRAWINGS

FIGS. 11A and 11B are diagrams plotting relations between the width of a first end portion and the sum of an optical leakage and the width of a disclination;

FIGS. 20A and 120B are top plan views showing a process for manufacturing the active matrix substrate;

FIGS. 25A to 25F are perspective views showing examples of electronic devices;

DESCRIPTION OF THE PREFERRED EMBODIMENTS

In order to retain the aperture ratio of the pixel portion of the liquid crystal display device, it is a recommended method to form the end portions of the pixel electrodes over the scanning lines, the signal lines and the capacity electrodes by forming interlayer films over the scanning lines, the signal lines and the capacity electrodes. In the top plan views showing the embodiments of the present invention, however, the scanning lines, the signal lines and the pixel electrodes are consciously shown distantly so that the positional relations between the characteristic portions of the pixel electrodes and the scanning lines and the signal lines may be easily understood. The method of manufacturing the recommendable liquid crystal display device will be described in detail in connection with the embodiments.

Figure 1A:
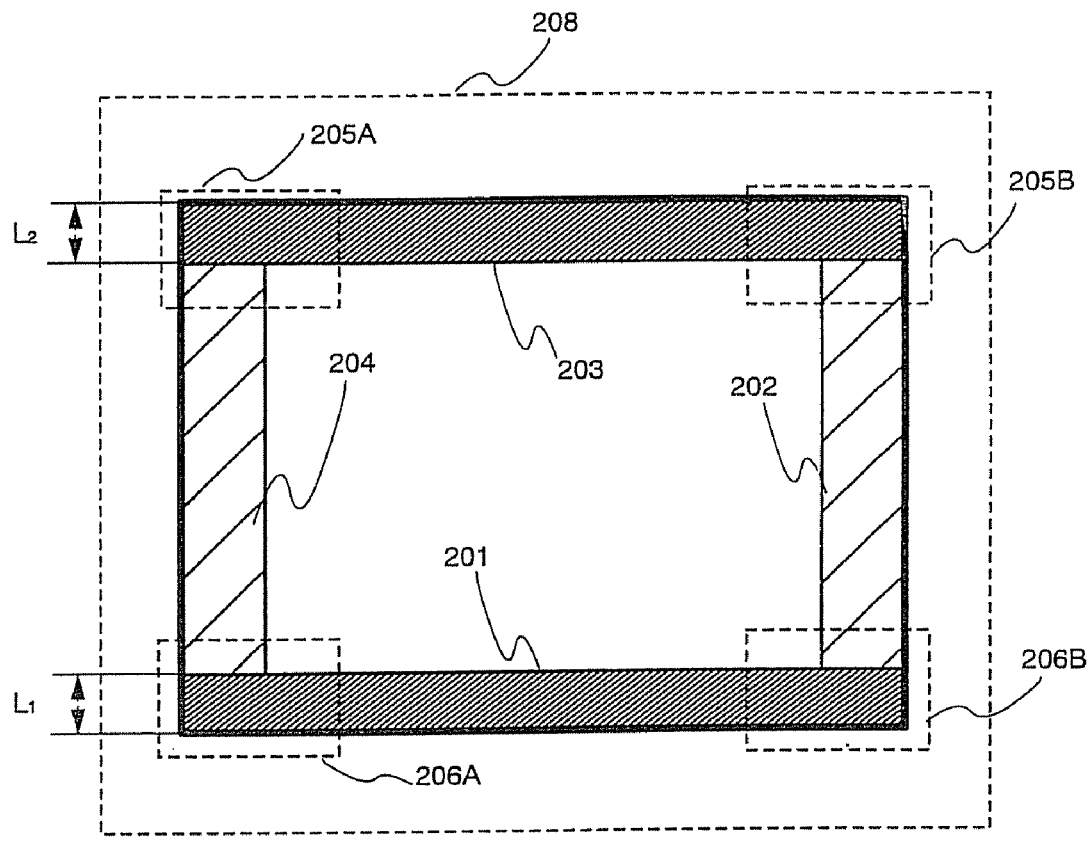
FIGS. 1A and 1B are a top plan view and a perspective view showing a pixel portion of the present invention.
Figure 1B:
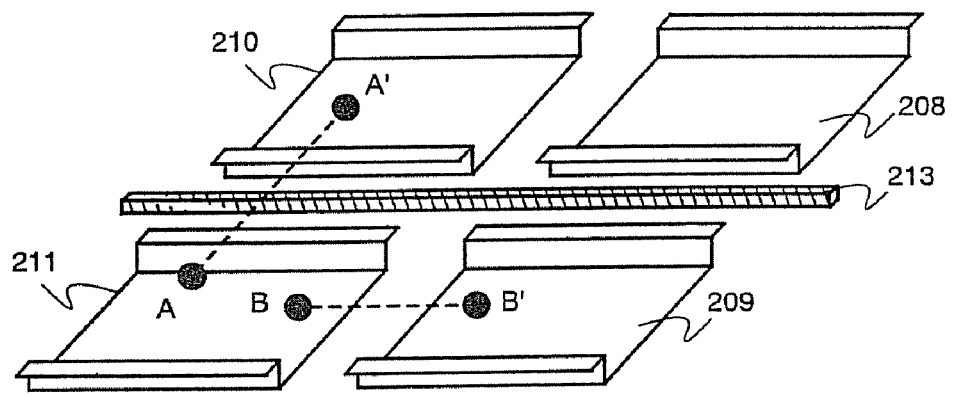
Figure 2:
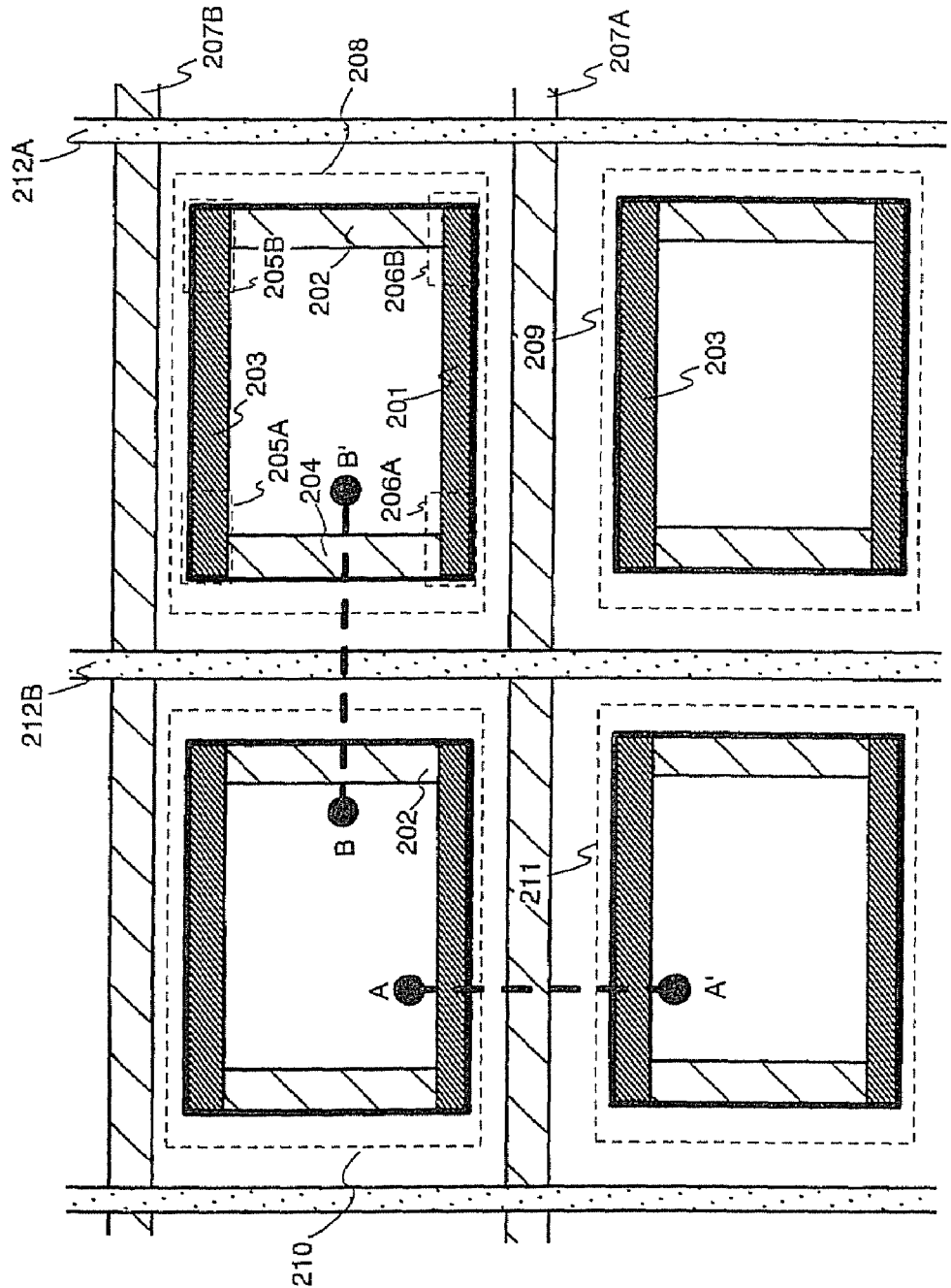
FIG. 2 is a top plan view showing the pixel portion of the present invention.
Figure 3:
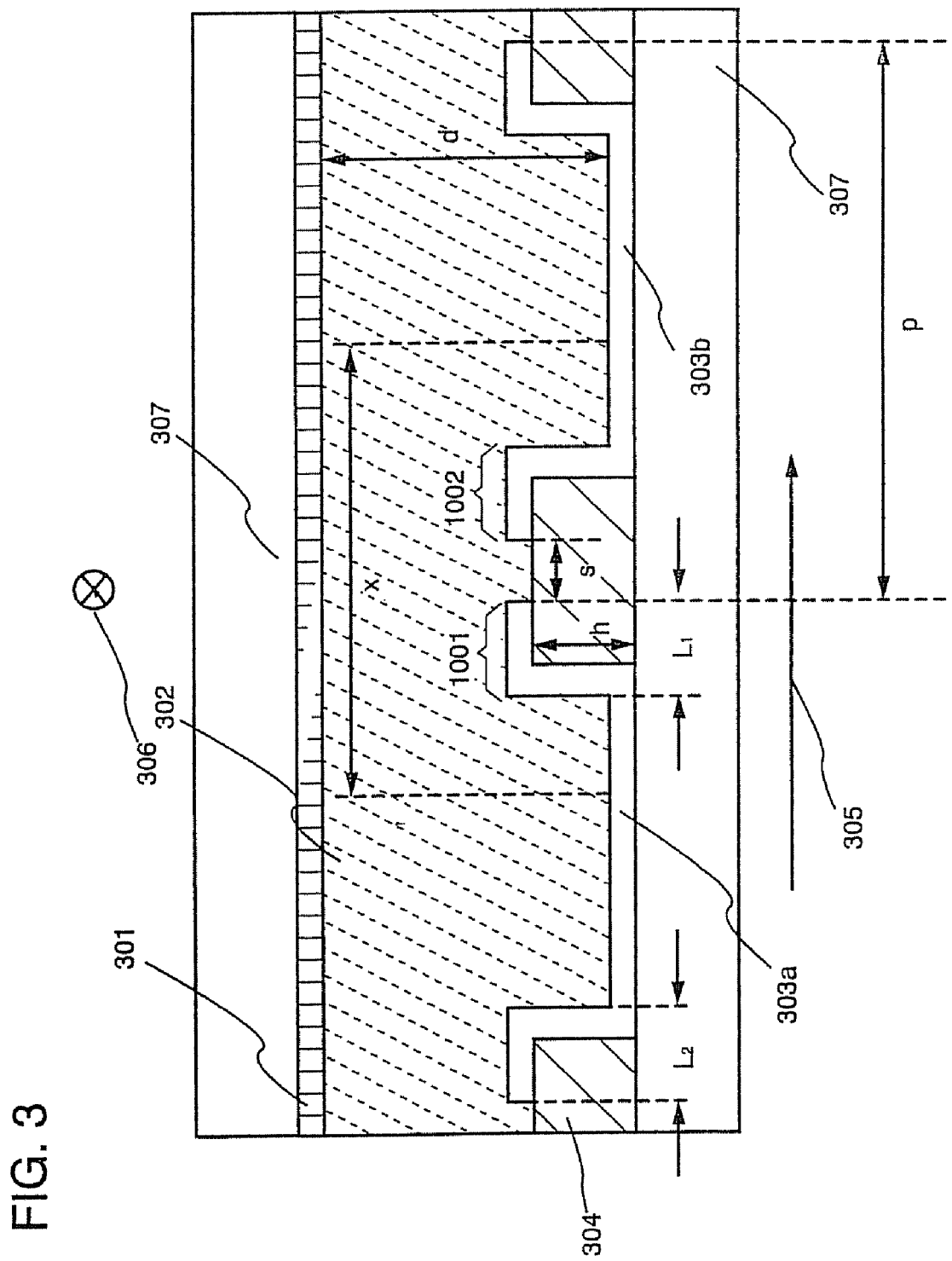
FIG. 3 is a sectional view showing a model of a simulation.
Figure 4A:
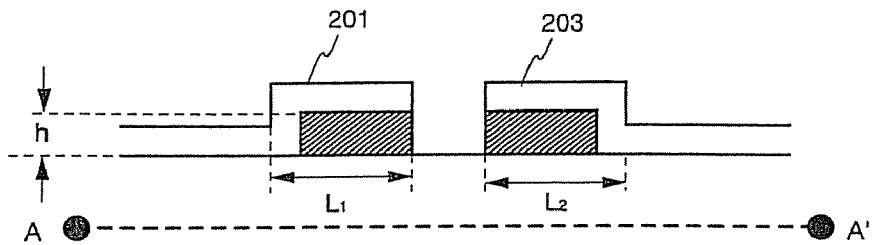
FIGS. 4A and 4B are sectional views showing the pixel portion of the present invention.
Figure 4B:
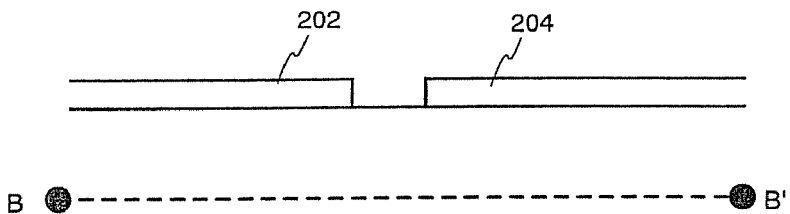
Figure 5A:
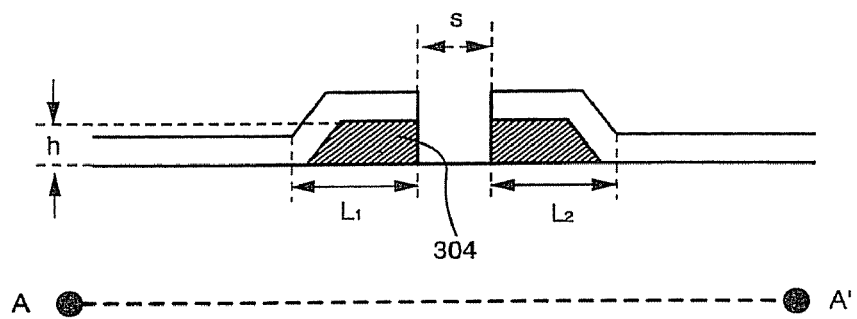
FIGS. 5A and 5B are sectional views showing the pixel portion of the present invention.
Figure 5B:
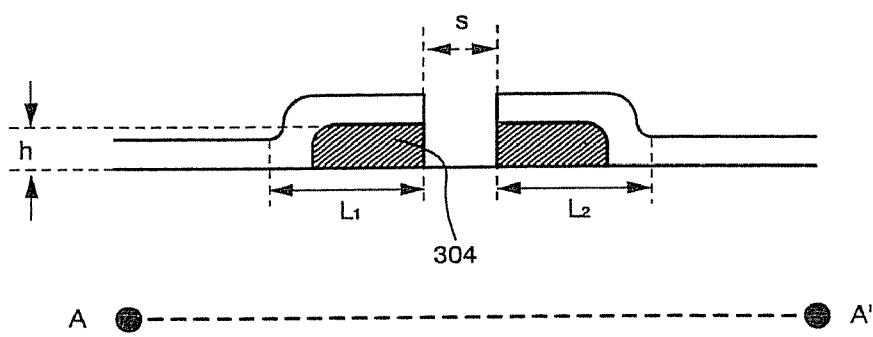
Figure 6A:
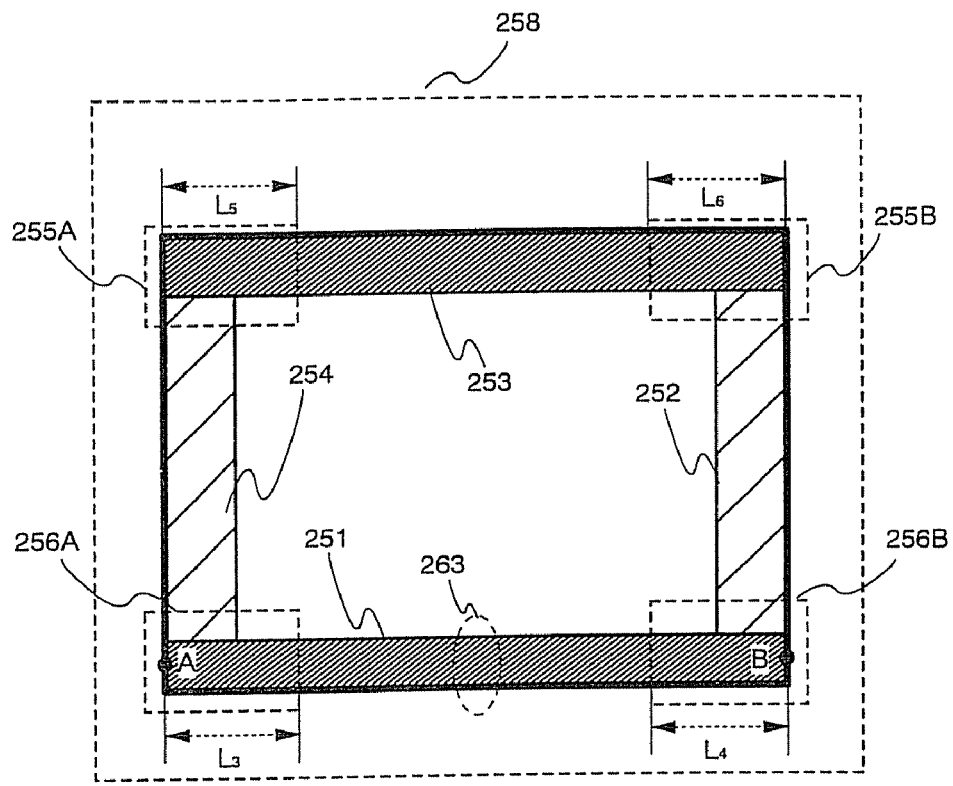
FIGS. 6A and 6B are a top plan view and a perspective view showing a pixel portion of the present invention.
Figure 6B:
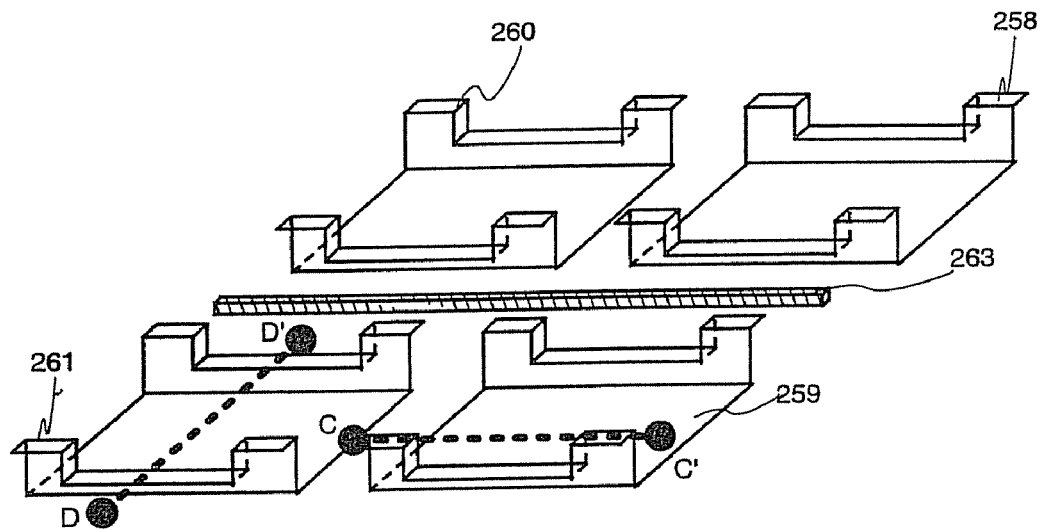
Figure 7:
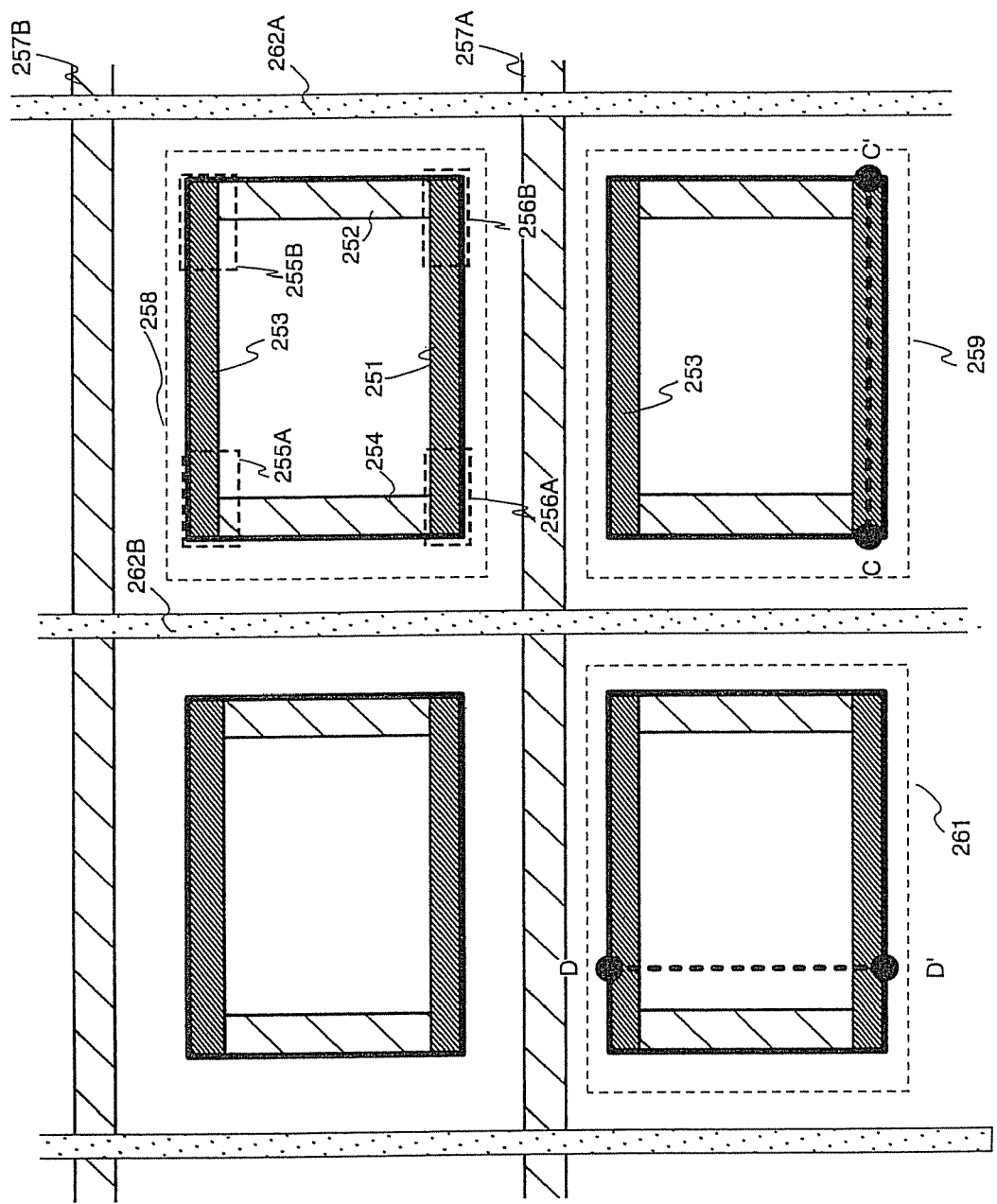
FIG. 7 is a top plan view showing the pixel portion of the present invention.
Figure 8A:
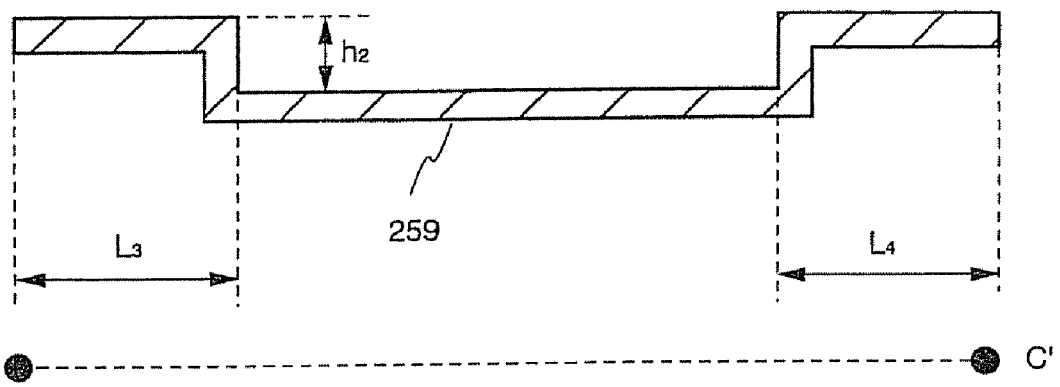
FIGS. 8A and 8B are sectional views showing the pixel portion of the present invention.
Figure 8B:
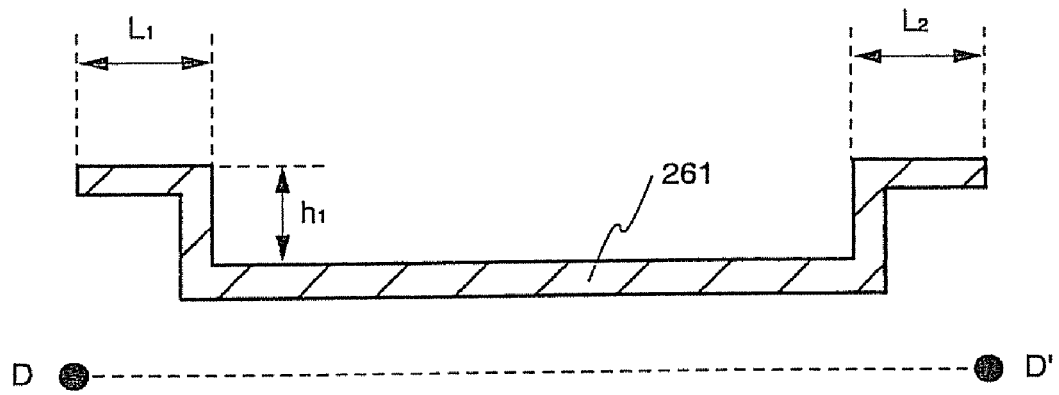
Figure 9:
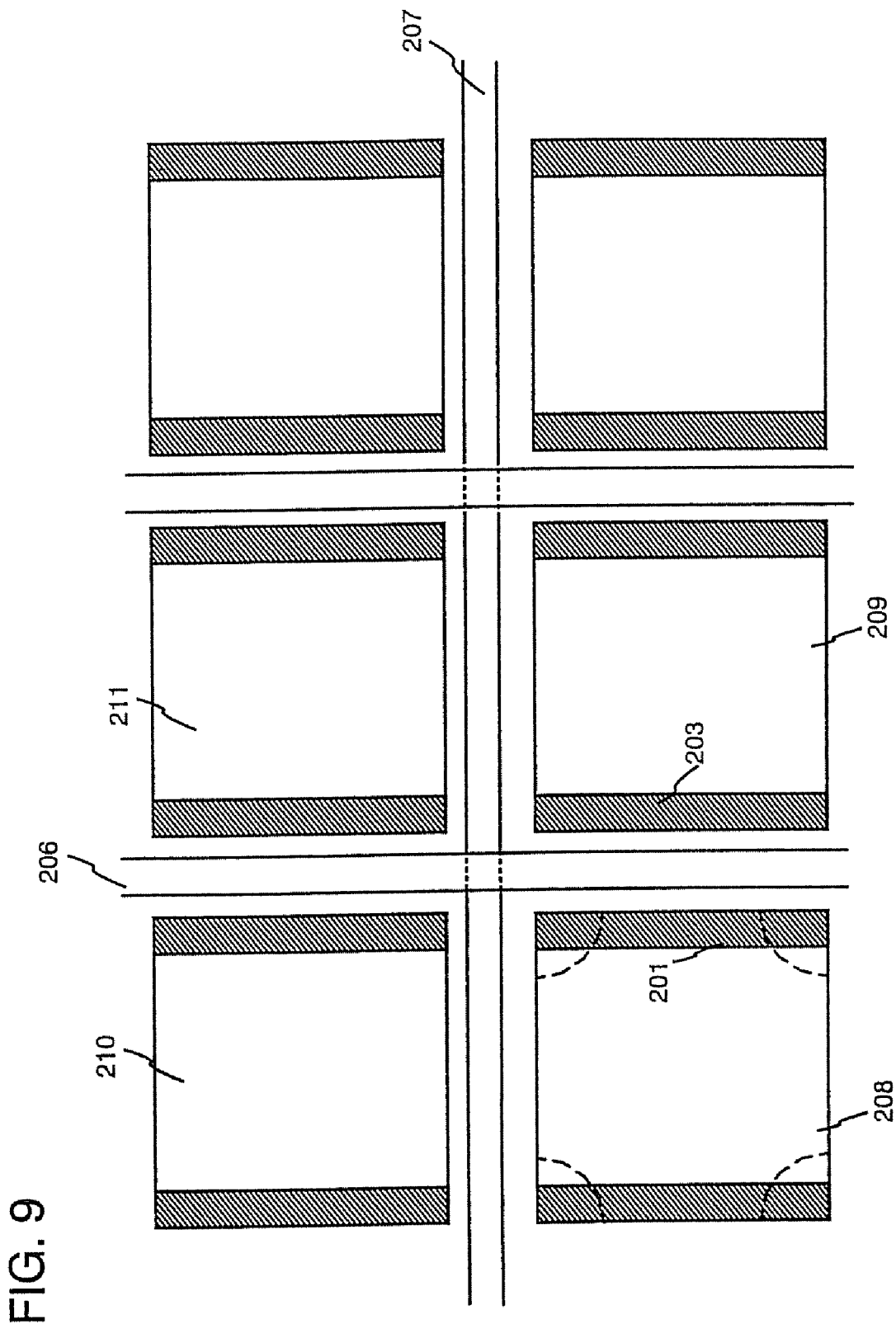
FIG. 9 is a top plan view showing one example of the pixel portion of the present invention.

In the liquid crystal display device for the source line inversion drive, as shown in a top plan view of FIG. 9, a first end portion 201 of a first pixel electrode 208 and a third end portion 203 of a second pixel electrode 209, as opposed to each other across a signal line 206, are raised with respect to the main face of the pixel electrodes.

When the adjoining pixel electrodes are at the potentials of the different polarities, the equipotential lines easily curve at the end portions of the adjoining pixel electrodes. Specifically, the equipotential lines easily curve between the first pixel electrode 208 and the second pixel electrode 209. Therefore, it is recommended that the first end portion 201 and the third end portion 203 of the pixel electrodes having the easily curving equipotential lines are raised with respect to the main face of the pixel electrodes.

In case the first pixel electrode 208 and a third pixel electrode 210 are at the potentials of an identical polarity, the equipotential lines make a curvature in the gap between the first pixel electrode 208 and the third pixel electrode 210, which is not considerably large in the gap between the pixel electrodes of the identical potential. When the first pixel electrode 208 and the third pixel electrode 210 adjoin each other, therefore, it is recommended that the second end portion and the fourth end portion of the pixel electrode positioned across the gap are formed at the same level as that of the main face of the pixel electrodes.

Figure 10:
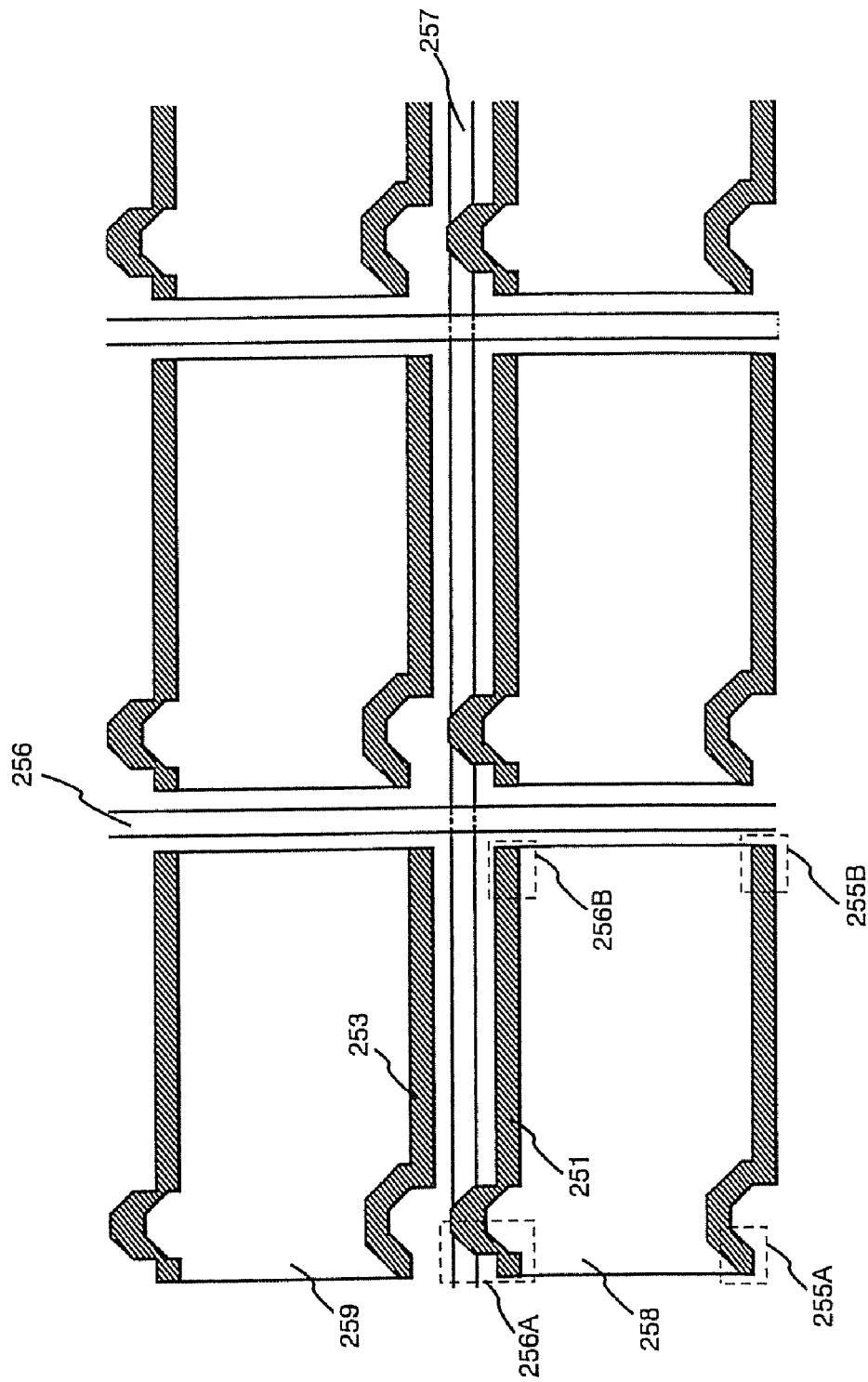
FIG. 10 is a top plan view showing one example of the pixel portion of the present invention.
Figure 12:
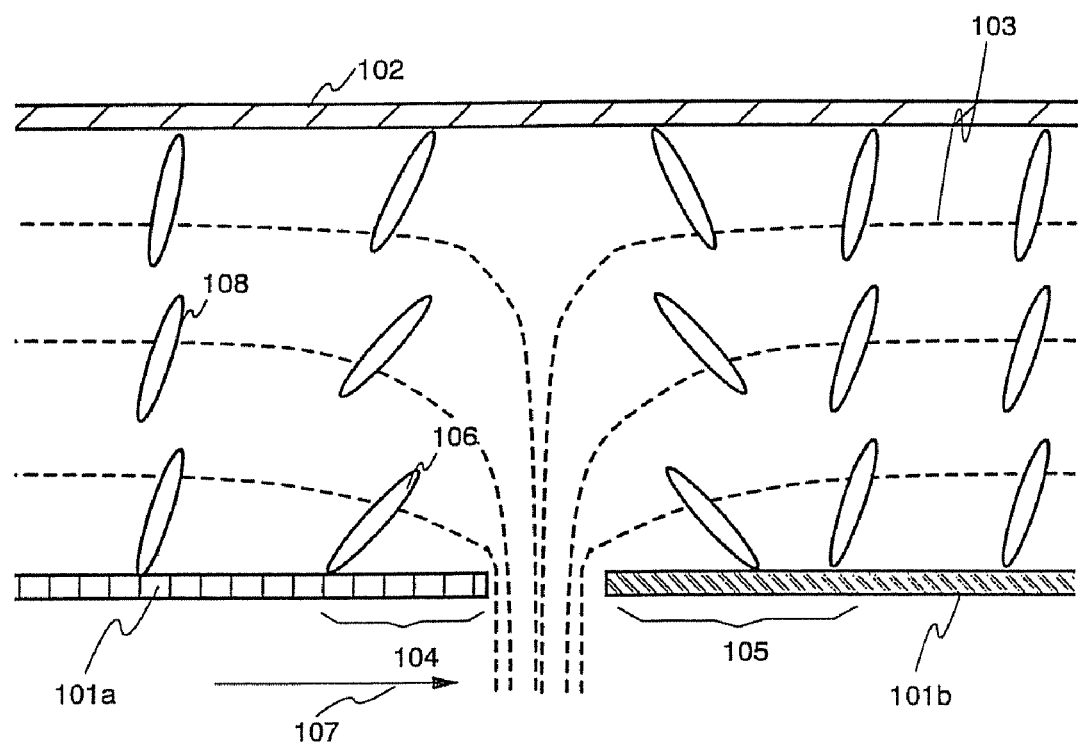
FIG. 12 is a schematic diagram showing a principle in which the optical leakage and the disclination occur.
Figure 13A:
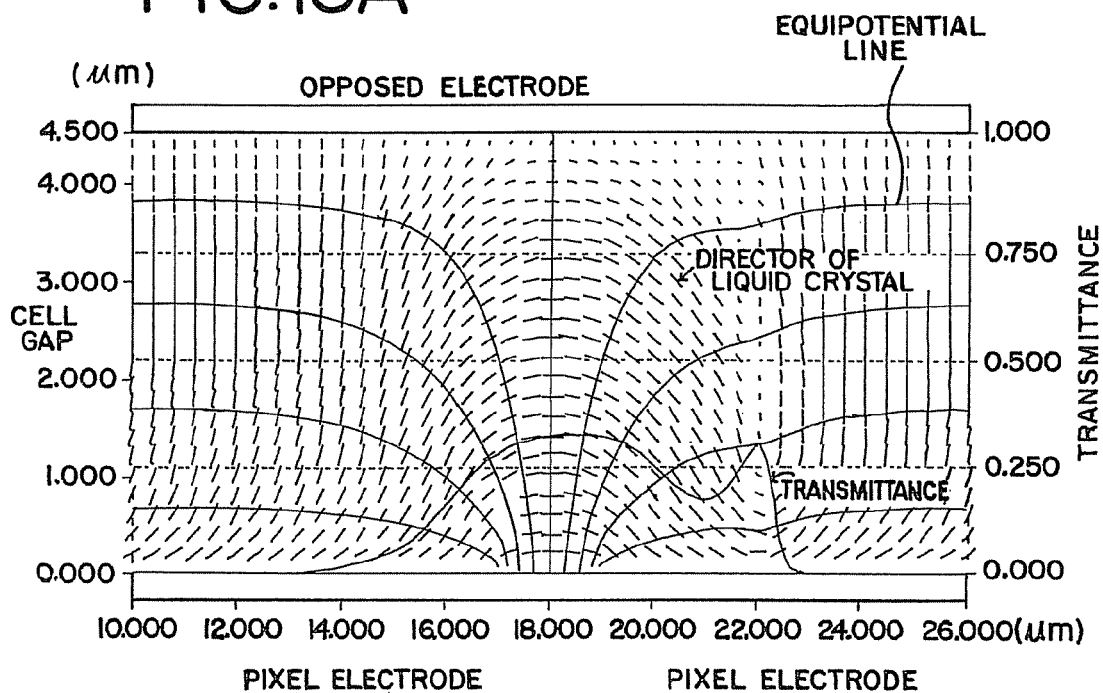
FIGS. 13A and 13B are sectional views showing the simulation results in which the adjoining pixel electrodes are at potentials of different polarities.
Figure 13B:
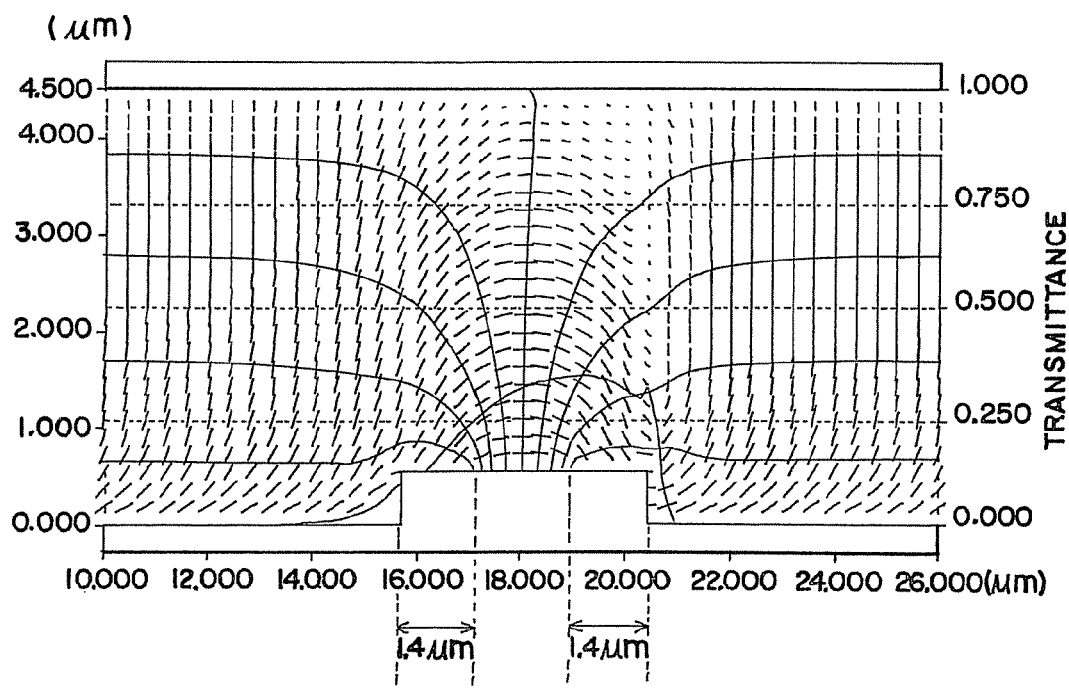
Figure 14:
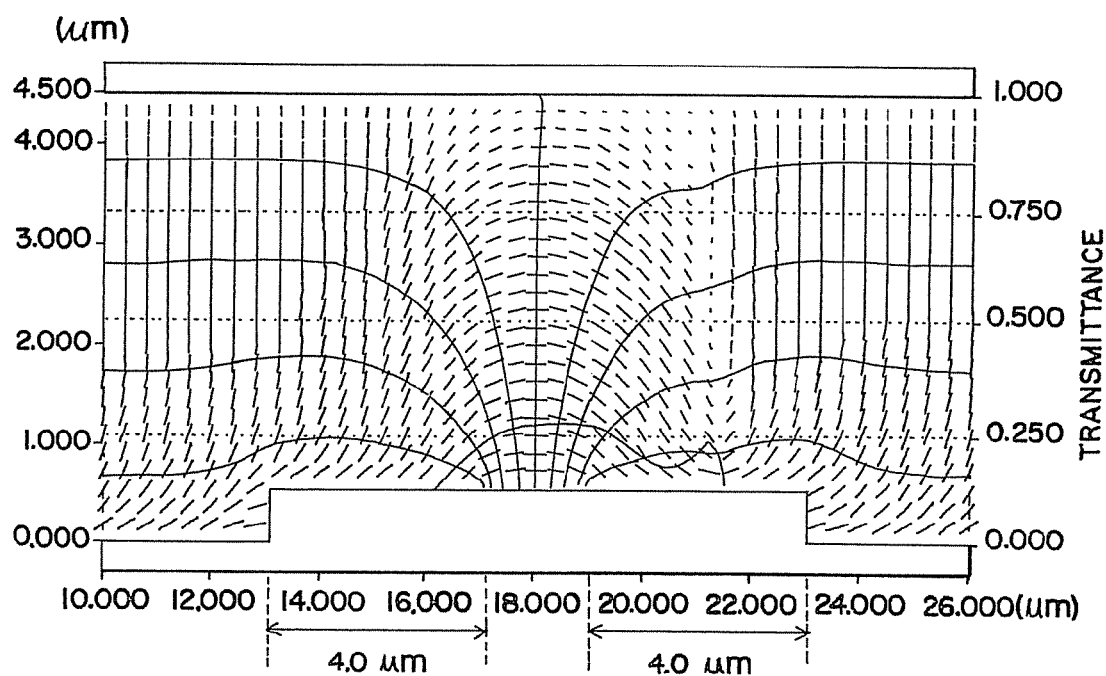
FIG. 14 is a sectional view showing the simulation results in which the adjoining pixel electrodes are at potentials of different polarities.
Figure 15A:
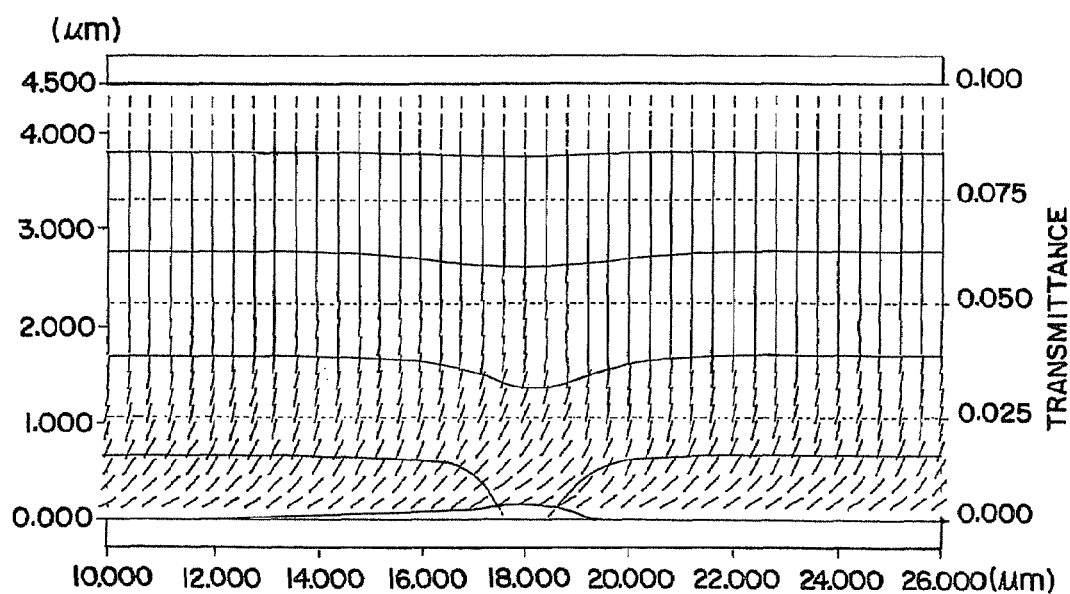
FIGS. 15A and 15B are sectional views showing the simulation results in which the adjoining pixel electrodes are at potentials of an identical polarity.
Figure 15B:
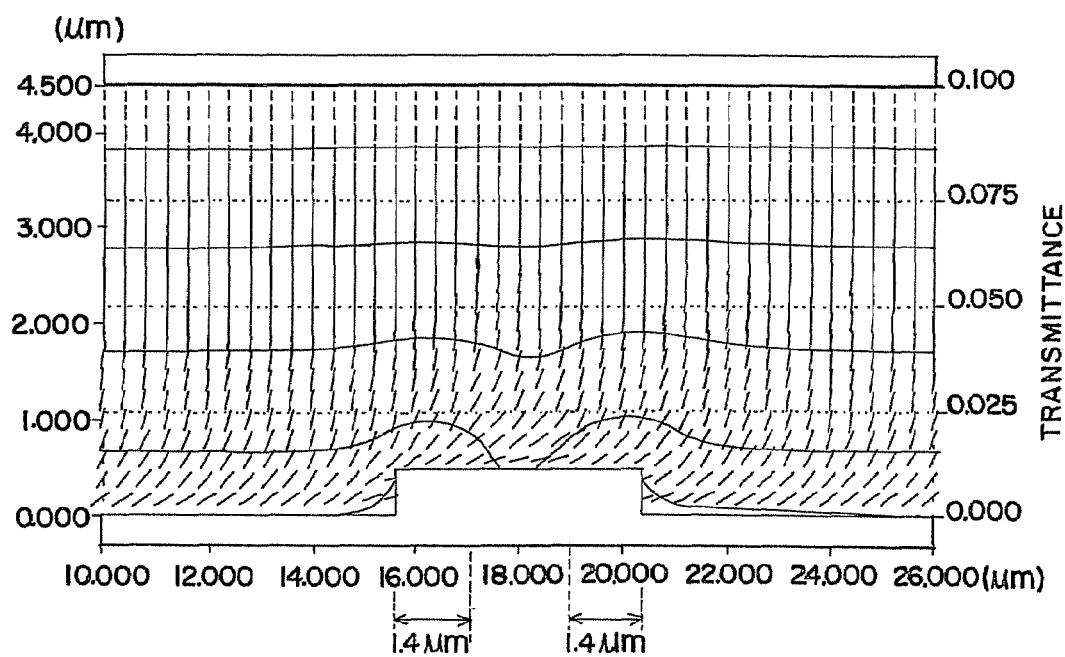
Figure 16:
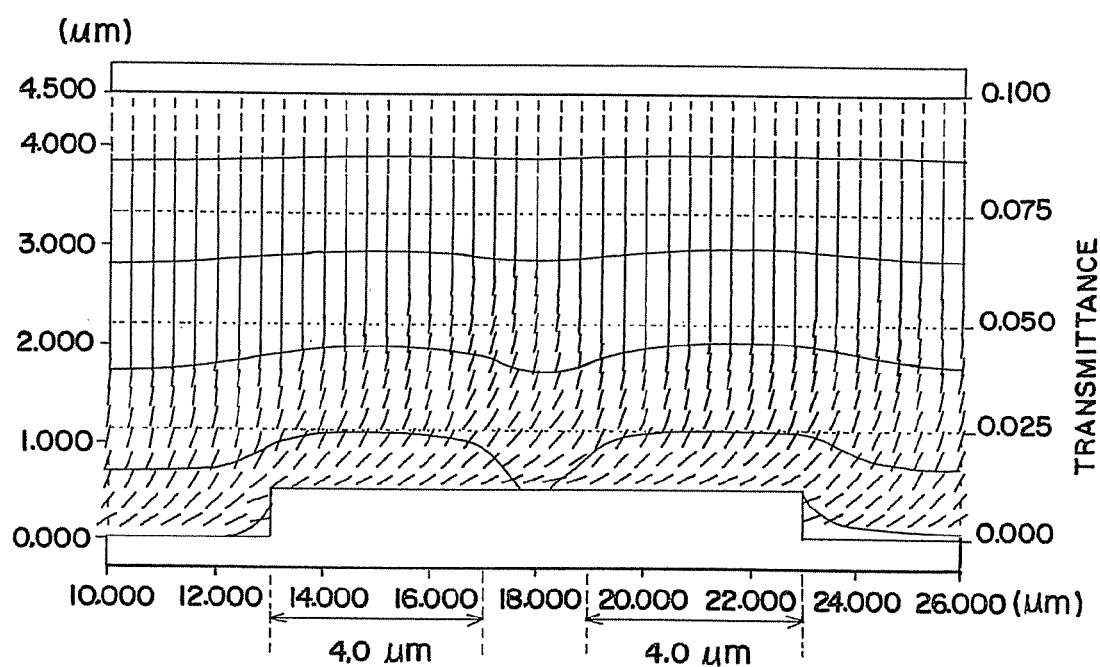
FIG. 16 is a sectional view showing the simulation results in which the adjoining pixel electrodes are at potentials of an identical polarity.
Figure 17A:
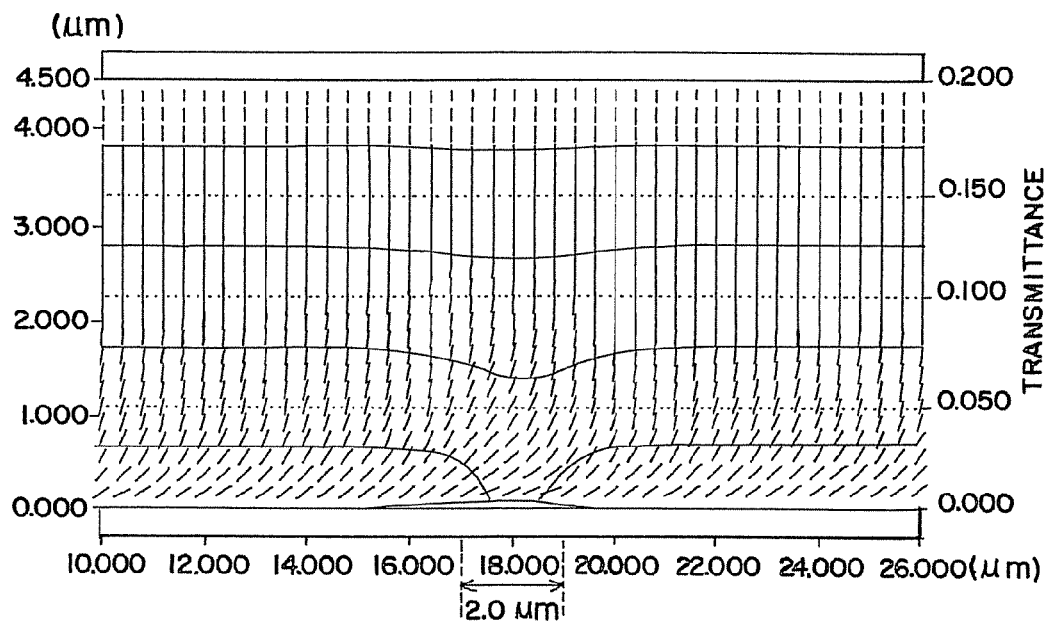
FIGS. 17A and 17B are sectional views showing the simulation results in which the adjoining pixel electrodes are at potentials of an identical polarity.
Figure 17B:
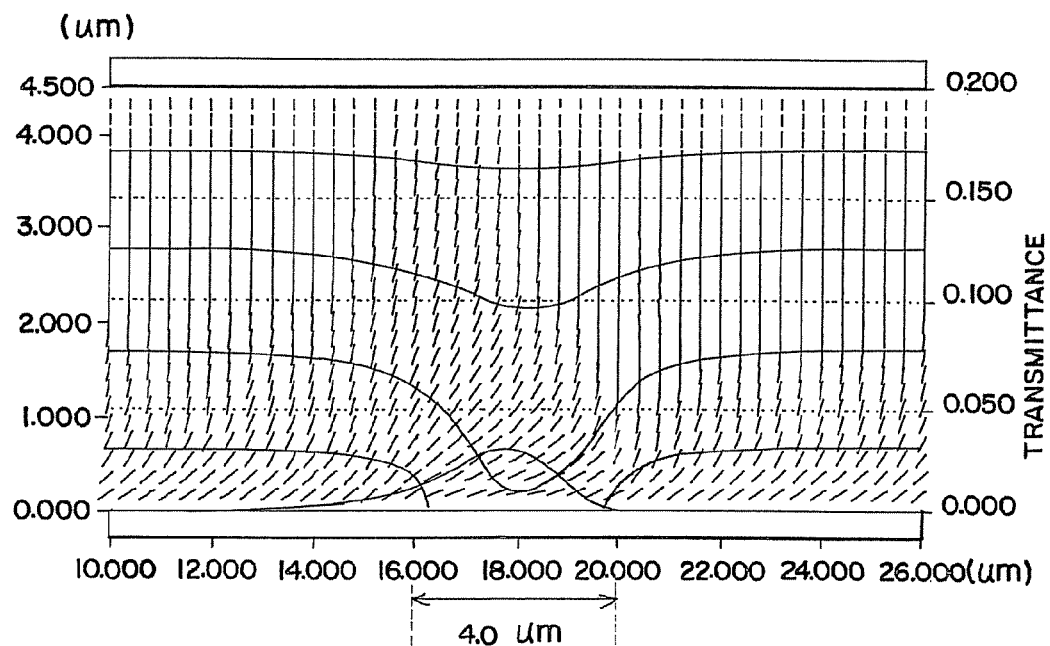
Figure 18:
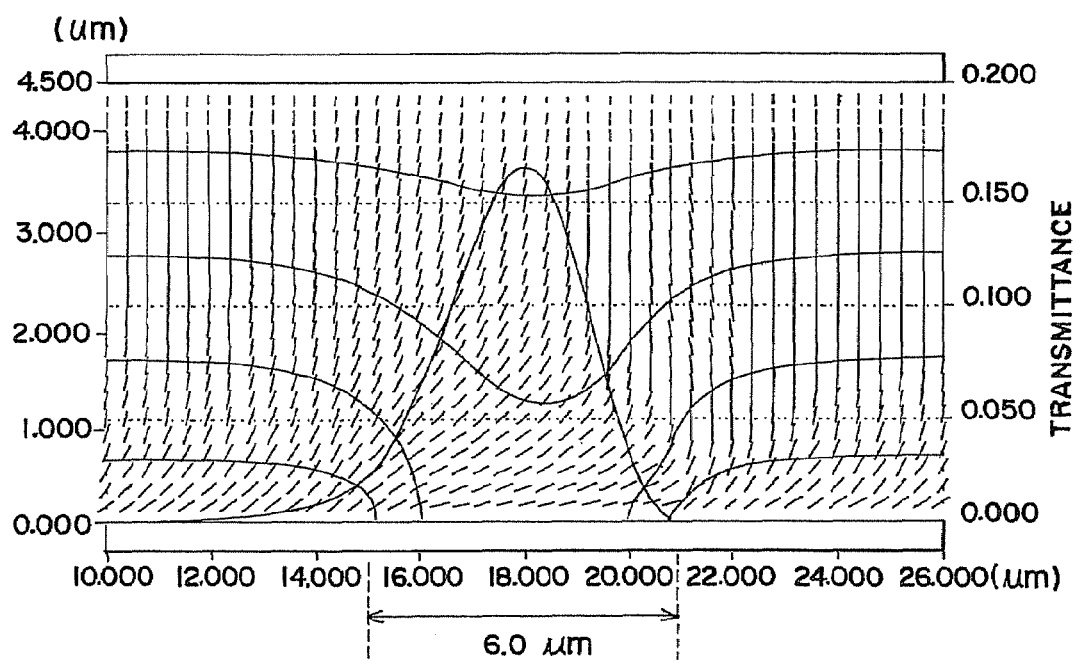
FIG. 18 is a sectional view showing the simulation results in which the adjoining pixel electrodes are at potentials of an identical polarity.

In FIG. 10, the pixel electrodes are formed into a polygonal shape having crests equal to or more than four. It is assumed that the drive is the gate line inversion drive. In the liquid crystal display device having a small pixel size, it is advantageous for writing the charges in the storage capacity to perform the gate line inversion drive.

A first end portion 251 and a third end portion 253 of a first pixel electrode 258 and a second pixel electrode 259, as opposed each other across a scanning line 257, are raised with respect to the main face of the pixel electrodes. Moreover, the two end portions 256A and 256B of the first end portion and the two end portions 255A and 255B of the third end portion are raised from the central portion of the first end portion and the central portion of the third end portion with respect to the main faces of the pixel electrodes so that the curvatures of the equipotential lines may be corrected in the serious curvature region of the equipotential lines. The second end portion and the fourth end portion of the pixel electrodes are at the same level of that of the main faces of the pixel electrodes.

Below the first end portion and the third end portion, it is recommended to pattern and form a photosensitive organic resin film and an organic resin film by a photolithography process. It is naturally possible to pattern and form an inorganic film such as a silicon oxide film, a silicon nitride film or a silicon oxynitride film, too.

In order to make the two end portions of the first end portion locally higher than the central portion of the first end portion, it is recommended to form the photosensitive resin film separately twice. It is also recommended to form the semiconductor layer, the scanning lines, and the signal lines and so on of the element substrate at the two end portions of the first end portion thereby to form the raised regions selectively with respect to the main face of the pixel electrodes.

Embodiment 1

Embodiments of the present invention will now be described with reference to FIGS. 19 to 23.

First, an electrically conducting film is formed on a substrate 601 having an insulating surface shown in a sectional view of FIG. 23B, and is patterned to form a scanning line 602. The scanning line also works as a light-shielding film for protecting a semiconductor layer from light that will be formed later. Here, a quartz substrate is used as a substrate 601, and a laminated-layer structure of a polysilicon film (50 nm thick) and a tungsten silicide (W—Si) film (100 nm thick) is used as the scanning line 602. Further, the polysilicon film prevents the substrate from being contaminated with the tungsten silicide.

Next, an insulating film 603 is formed maintaining a thickness of 100 to 1000 nm (typically, 300 to 500 nm) to cover the scanning line 602. Here, a silicon oxide film having a thickness of 100 nm formed by the CVD method and a silicon oxide film having a thickness of 280 nm formed by the LPCVD method are laminated one upon the other.

Then, an amorphous semiconductor film is formed maintaining a thickness of 10 to 100 μm. Here, the amorphous silicon film is formed maintaining a thickness of 69 nm by the LPCVD method. Next, the amorphous silicon film is crystallized by a technology disclosed in Japanese Patent Laid-Open No. 8-78329. According to the technology disclosed in this publication, a metal element is selectively added to the amorphous silicon film to promote the crystallization followed by the heat treatment to form a crystalline silicon film which spreads starting from the region where the metal element is added. Here, nickel is used as a metal element for promoting the crystallization and, then, a heat treatment (450° C., one hour) is executed for dehydrogenation, followed by another heat treatment (600° C., 12 hours) for crystallization.

Then, Ni is put to the gettering from the region where the active layer of TFT is formed. The region of the active layer of TFT is covered with a mask (silicon oxide film), phosphorus (P) is added to a portion of the crystalline silicon film and is heat-treated (at 600° C. in a nitrogen atmosphere for 12 hours).

Figure 19A:
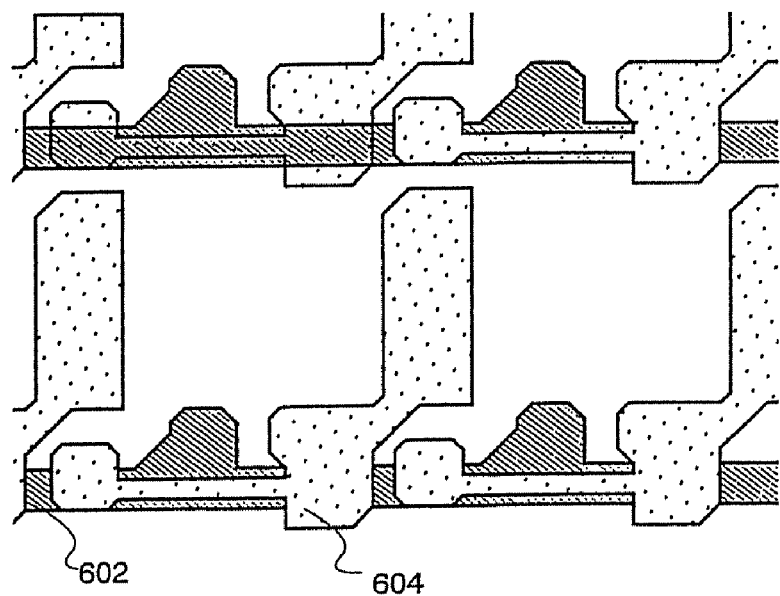
FIGS. 19A and 19B are top plan views showing a process for manufacturing an active matrix substrate.

Then, after the mask is removed, unnecessary portions of the crystalline silicon film are removed by patterning to form semiconductor layers 604a and 604b. The semiconductor layers 604a and 604b are the same semiconductor layers 604. FIG. 19A is a top view of the pixel after the semiconductor layer is formed. There are shown a scanning line 602 and a semiconductor layer 604.

Next, to form a storage capacity, a resist is formed, and a portion (region for forming the storage capacity) 604b of the semiconductor layer is doped with phosphorus.

Then, the resist is removed and an insulating film is formed to cover the semiconductor layer. Then, to increase the capacity of the storage capacitor, a resist is formed, and the insulating film is removed from the region 604b where the storage capacity is to be formed.

Then, an insulating film (gate insulating film 605) is formed by the thermal oxidation. Due to this thermal oxidation, the gate-insulating film finally acquires a thickness of 80 nm. On the region where the storage capacity is to be formed, there is formed an insulating film having a thickness smaller than that of other regions. It is desired that the insulating film has a thickness of 40 to 50 nm on the region where the storage capacity is to be formed.

Next, the channel doping is effected onto the whole surface or selectively to add p-type or n-type impurities at a low concentration to the region that serves as the channel region of the TFT. The step of this channel doping is the one for controlling the threshold voltage of the TFT. Here, boron is added by the ion-doping method by exciting diborane ($B_2H_6$) by plasma but without effecting the mass separation. It is, of course, allowable to employ the ion plantation method by effecting the mass separation.

Next, contact holes that reach the scanning lines are formed by etching the insulating film.

Then, an electrically conducting film is formed and is patterned to form a gate electrode 606a and a capacitor wiring 606b. Here, use is made of a laminated-layer structure of a silicon film (150 nm thick) doped with phosphorus and a tungsten silicide film (150 nm thick). The storage capacitor is formed by parts of the capacitor wiring and of the semiconductor layer with the insulating film 605 as a dielectric.

Figure 19B:
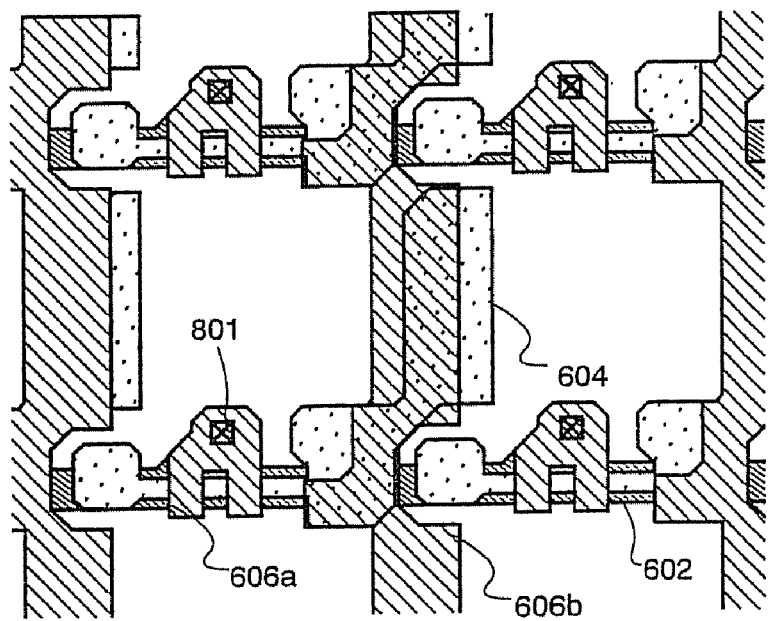

FIG. 19B is a top view of a pixel after the gate electrode and the capacitor wiring are formed. The gate electrode 606a is electrically conductive to the scanning line 602 through a contact hole 801. A region where the semiconductor layer 604 is overlapped on the capacitor wiring 606b via an insulating film works as the storage capacitor.

Then, by using the gate electrode and the capacitor wiring as masks, phosphorus is added at a low concentration in a self-aligned manner. The concentration of phosphorus in the region to where it is added at a low concentration, is adjusted to be from $1 \times 10^{16}$ to $5 \times 10^{18}$ atoms/cm$^3$ and, typically, from $1 \times 10^{16}$ to $5 \times 10^{18}$ atoms/cm$^3$.

Next, a resist is formed and phosphorus is added at a high concentration by using the resist as a mask, thereby to form a region containing impurities at a high concentration that serves as a source region or a drain region. The phosphorus concentration in the region of the high impurity concentration is adjusted to be from $1 \times 10^{20}$ to $1 \times 10^{21}$ atoms/cm$^3$ and, typically, from $2 \times 10^{20}$ to $5 \times 10^{20}$ atoms/cm$^3$. In the semiconductor layer, a region overlapped on the gate electrode serves as a channel region, and a region covered with a resist serves as an impurity region of a low concentration and works as an LDD region. After the impurities are added, the resist is removed.

Though not diagramed, the region that becomes an n-channel TFT is covered with a resist, and boron is added to form a source region or a drain region in order to form a p-channel TFT used for a driver circuit formed on the same substrate as the pixels.

Next, after the resist is removed, a passivation film 607 is formed to cover the gate electrode 606a and the capacitor wiring 606b. Here, a silicon oxide film is formed maintaining a thickness of 70 nm. Next, the heat treatment is effected to activate the n-type or p-type impurities added into the semiconductor layer at their respective concentration. Here, the heat treatment is effected at 950° C. for 30 minutes.

Then, an interlayer insulating film 608 of an inorganic material is formed. In this Embodiment, a silicon oxynitride film is formed maintaining a thickness of 800 nm.

Then, a contact hole is formed to reach the semiconductor layer, and an electrode 610 and a signal line 609 are formed. In this Embodiment, the electrode and the signal lines are formed of a laminated-layer film of a four-layer structure in which a Ti film is formed maintaining a thickness of 60 nm, a TiN film is formed maintaining a thickness of 40 nm, an aluminum film containing Si is formed maintaining a thickness of 300 nm, and a TiN film is formed maintaining a thickness of 100 nm all by sputtering in a continuous manner.

Figure 20A:
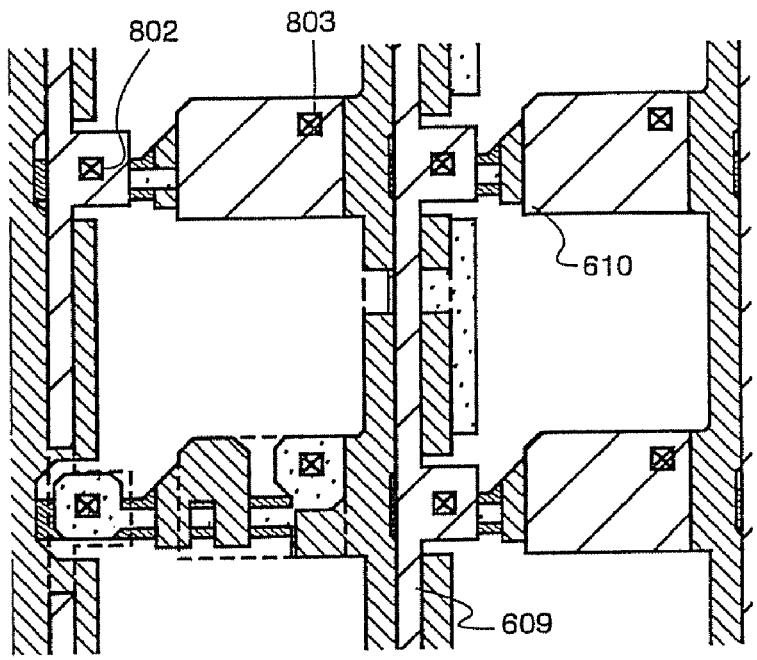

FIG. 20A is a top view of the pixel after the electrode and the signal lines are formed. The signal line 609 is electrically conductive to the semiconductor layer through the contact hole 802. The electrode 803 is electrically conductive to the semiconductor layer through the contact hole 803.

Then, the hydrogenation treatment is effected at 350° C. for one hour.

Next, an interlayer insulating film 612 of an organic resin material is formed. An acrylic resin film of 1.0 μm thickness is used here. Thereafter, a light-shielding electrically conducting film is formed maintaining a thickness of 100 nm on the interlayer-insulating film to thereby form a light-shielding film 613.

Figure 20B:
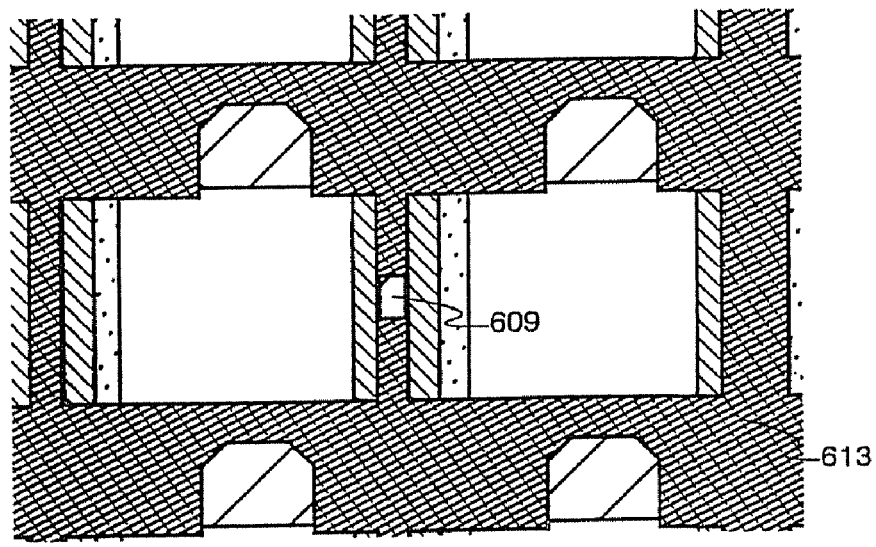

Here, a top plan view of a pixel portion after a shielding film 613 was formed is shown in FIG. 20B. The shielding film 613 has a role to prevent the optical leakage and the disclination from being visually confirmed, and a role to shield the electric field, as established as a result that the signal line has a potential, so that the orientation of the liquid crystal may not be disturbed by the potential owned by the signal line. For this, the shielding layer overlaps a signal line 609.

The shielding film 613 over the signal line 609 is formed in the gap between the pixel electrode and the pixel electrode, as will be described hereinafter. As a result, the corrugations due to the film thickness of the shielding film are not formed at the end portions of the pixel electrodes along the signal line. The end portions of a pixel electrode 616 along the signal line are formed on a flat face.

Next, an insulating film 614 is formed to have a thickness of 100 nm. This insulating film forms a silicon oxynitride film having a thickness of 100 nm to 300 nm.

Next, a photosensitive resin film is used to perform a photolithography step thereby to form a ridge 615 of a thickness of 0.5 μm along the scanning line. The photosensitive resin film uses a material which lowers the viscosity by diluting BPR-107VL of JSR Company with PGMEA (Propylene Glycol Monomethyl Ether Acetate).

Next, contact holes are formed to reach the electrodes. Next, a transparent conductive film (e.g., an indium-tin oxide (ITO) film) of 100 nm is formed and is patterned to form the pixel electrodes 616.

Here, there can be formed a storage capacitor 617 by making the pixel electrodes and the shielding film 613 into the electrodes and the insulating film 614 into a dielectric member.

Figure 21:
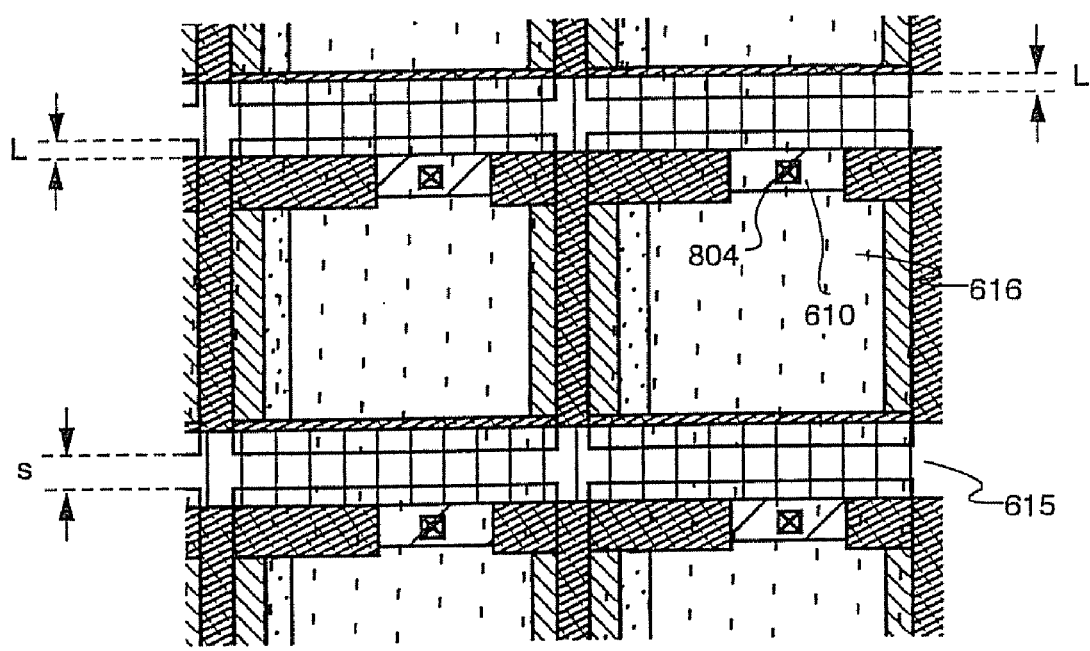
FIG. 21 is a top plan view showing a process for manufacturing the active matrix substrate.

Here, the top plan view of the pixels after the pixel electrodes 616 were formed is shown in FIG. 21. An electrode 610 and the pixel electrode are conducted through a contact hole 804. The ridge 615, as formed along the scanning line, has a pattern of a slender square. The distance (s) between the pixel electrode and the pixel electrode is 2.0 μm, and the overlap width (L) between the pixel electrode and the ridge is 1.0 μm.

The substrate thus manufactured by the steps thus far described will be called the "active matrix substrate".

Figure 22:
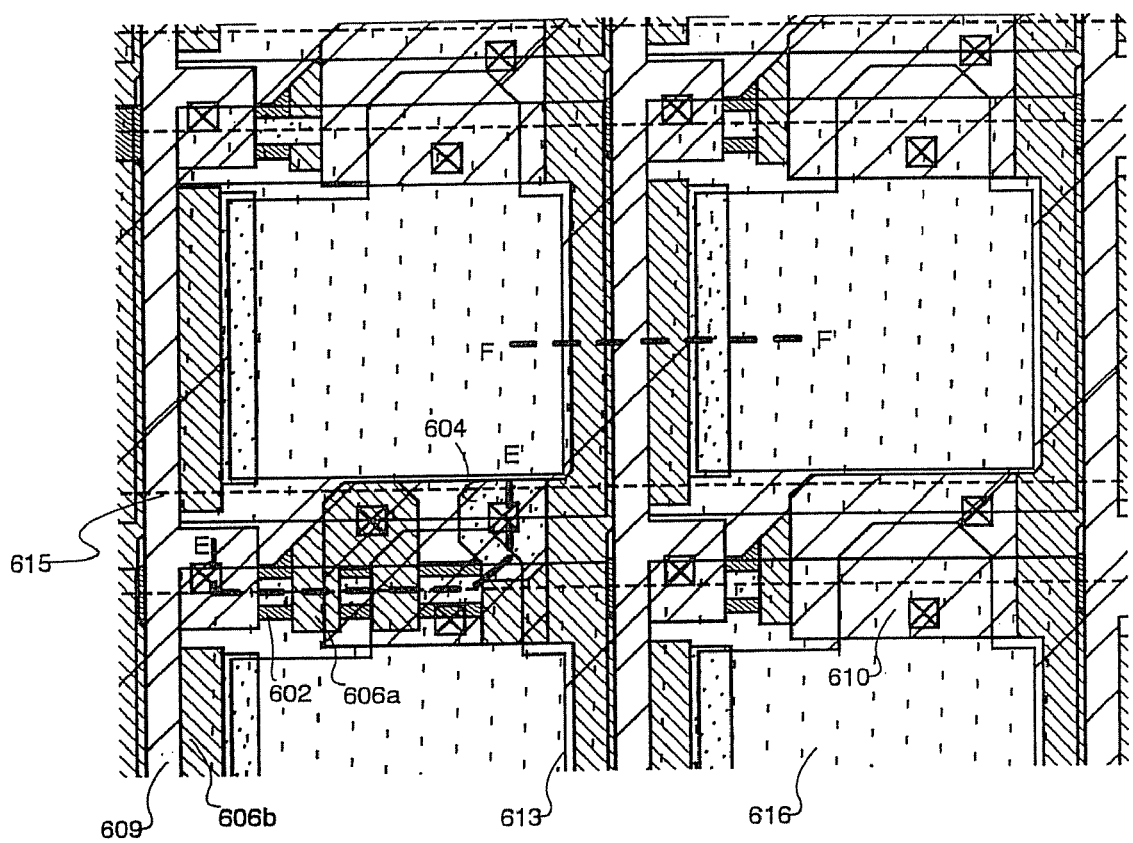
FIG. 22 is a top plan view showing one example of the pixel portion of the present invention.
Figure 23:
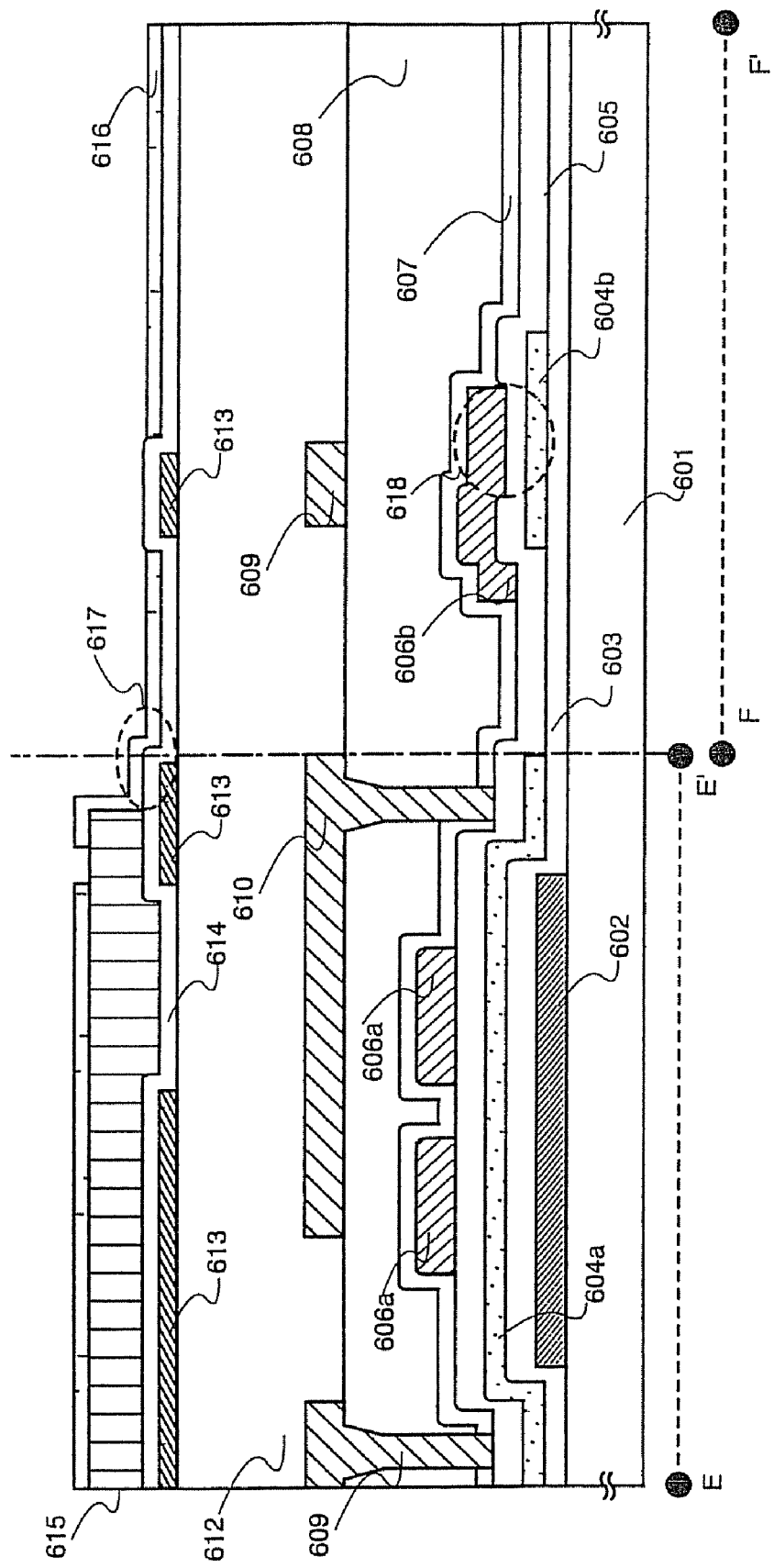
FIG. 23 is a sectional view showing one example of the active matrix substrate of the present invention.

The top plan view showing the electrodes, the wiring lines and the semiconductor layer formed in the pixel portion are presented in FIG. 22. A section, as cut along chain lines E-E' and F-F' from the top plan view of FIG. 22, is present in FIG. 23.

The present embodiment is only one example, and it is needless to say that the present invention should not be limited to the steps of the present embodiment. For example, each conductive film may be exemplified by one made of tantalum (Ta), titanium (Ti), molybdenum (Mo), tungsten (W), chromium (Cr) or silicon (Si).

The active matrix substrate of the present embodiment can be used in a transmission type liquid crystal display device. When a conductive film having a function to reflect a light is used as a pixel electrode in place of the transparent conductive film, the active matrix substrate of the present embodiment can be used in a reflection liquid crystal display device.

Embodiment 2

This embodiment deals with the steps for fabricating a liquid crystal display device of the active matrix type using the active matrix substrate fabricated in Embodiment 1. The description refers to FIG. 24.

First, the active matrix substrate is obtained in accordance with Embodiment 1.

Next, a transparent electrode 701 of a transparent electrically conducting film is formed on a light-transmitting substrate 700. In this embodiment, the thus constituted substrate is called opposing substrate.

Then, an oriented film 703 is formed on the active matrix substrate and on the opposing substrate, and is rubbed. The liquid crystal display device fabricated according to this Embodiment is a panel of the projection type having a diagonal size of from about 0.3 inches to about 1 inch. In the panel of this kind, the pixels have a size of as small as 10 μm to 20 μm, and the defect caused by spacers becomes no longer negligible. The liquid crystal display device of this embodiment, therefore, uses no spacer.

The active matrix substrate on which the pixel portions and the driver circuits are formed, is stuck to the opposing substrate with a sealing member. The sealing member contains a filler, and the two pieces of substrates are stuck together maintaining a uniform gap due to the filler. The cell gap between the pixel portions is 4.5 μm.

Figure 24:
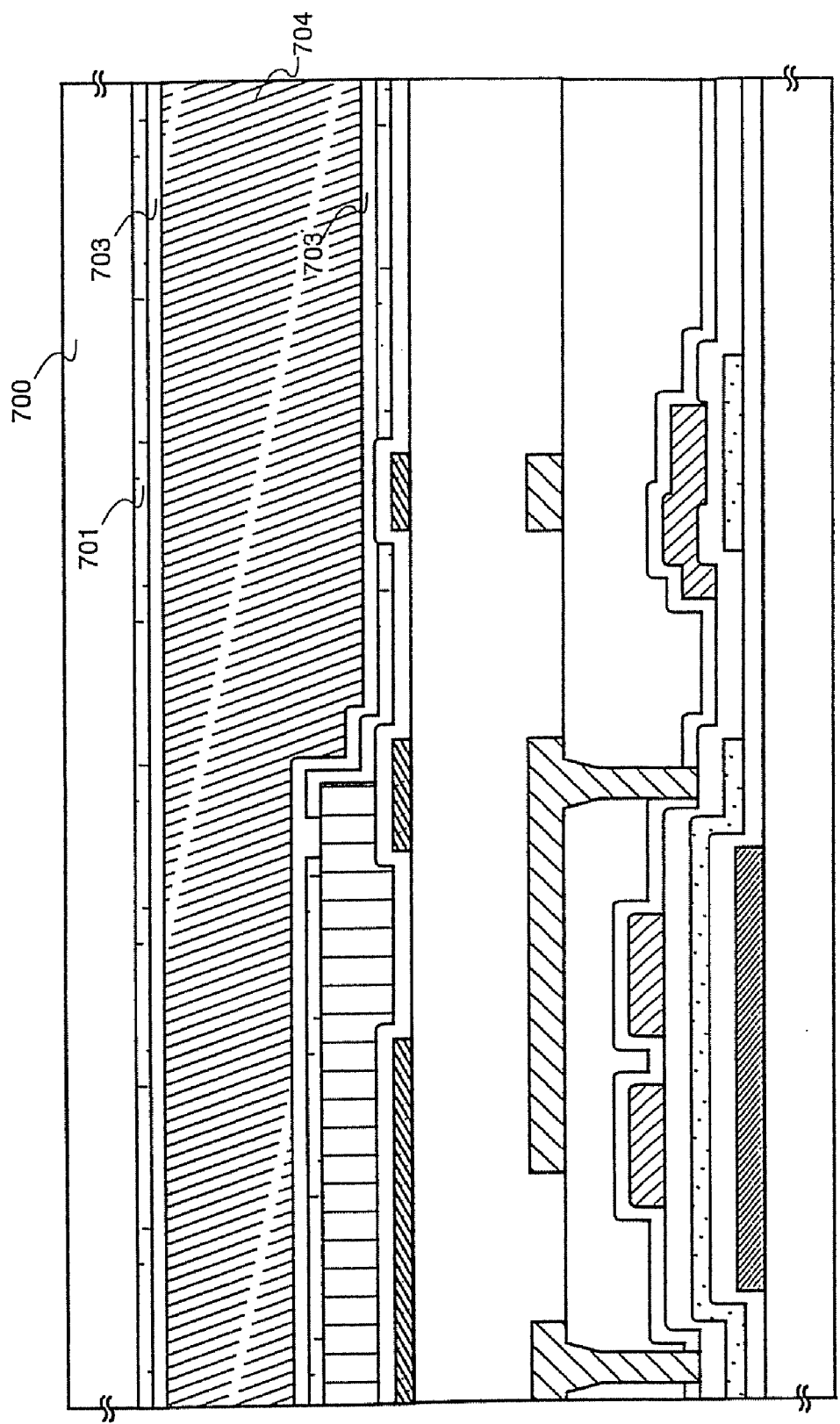
FIG. 24 is a sectional view showing a liquid crystal display device.

Thereafter, a liquid crystal material 704 is poured into between the two substrates, and is completely sealed with a sealing agent (not shown). The liquid crystal material 704 may be a known material. Thus, the liquid crystal display device of the active matrix type is completed as shown in FIG. 24. As required, further, the active matrix substrate or the opposing substrate is divided into a desired shape. Further, a polarizer plate is suitably provided relying upon the known technology. An FPC is stuck, too, according to the known technology.

Referring to Embodiment 1, the liquid crystal display device is formed that is constituted the following; the cell gap to be 4.5 μm, the distance between the pixel electrodes is 2.0 μm, the height to be 0.5 μm, and the widths (L) of overlapping portion with the pixel electrode and the height to be 1.0 μm. It is estimated that the sum of widths by which the leakage of light and the disclination are decreased is 2.2 μm as compared with when there is no height by the graph of FIG. 11.

Thus fabricated liquid crystal display panel can be used as a display unit for a variety of electronic devices.

Embodiment 3

The liquid crystal display device formed by implementing an embodiment between above-mentioned Embodiments 1 and 2 can be applied to various electro-optical equipments. Thus the present invention can be applied to all of the electronic equipments having these electro-optical devices as the display portion.

The following can be given as examples of the electronic equipment: video cameras; digital cameras; projectors; head mounted displays (goggle type display); car navigation systems; car stereo; personal computers; portable information terminals (such as mobile computers, portable telephones and electronic notebook). An example of these is shown in FIGS. 25, 26 and 27.

FIG. 25A shows a personal computer, and it includes a main body 2001, an image input section 2002, a display portion 2003, and a keyboard 2004. The present invention is applicable to the display portion 2003.

FIG. 25B shows a video camera, and it includes a main body 2101, a display portion 2102, a voice input section 2103, operation switches 2104, a battery 2105, and an image receiving section 2106. The present invention is applicable to the display portion 2102.

FIG. 25C shows a mobile computer, and it includes a main body 2201, a camera section 2202, an image receiving section 2203, operation switches 2204, and a display portion 2205. The present invention is applicable to the display portion 2205.

FIG. 25D shows a goggle type display, and it includes a main body 2301; a display portion 2302; and an arm section 2303. The present invention is applicable to the display portion 2302.

FIG. 25E shows a player using a recording medium which records a program (hereinafter referred to as a recording medium), and it includes a main body 2401; a display portion 2402; a speaker section 2403; a recording medium 2404; and operation switches 2405. This player uses DVD (digital versatile disc), CD, etc. for the recording medium, and can be used for music appreciation, film appreciation, games and Internet. The present invention is applicable to the display portion 2402.

FIG. 25F shows a digital camera, and it includes a main body 2501; a display portion 2502; a view finder 2503; operation switches 2504; and an image receiving section (not shown in the figure). The present invention can be applied to the display portion 2502.

Figure 26A:
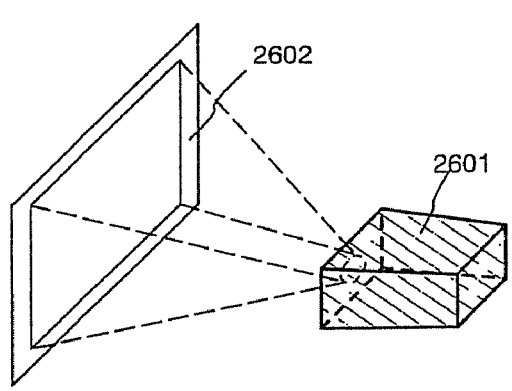
FIGS. 26A to 26D are perspective views showing examples of the electronic devices.

FIG. 26A is a front-type projector, and it includes a projection device 2601 and a screen 2602. The present invention is applicable to a liquid crystal display device 2808 which comprises one of the projection device 2601.

Figure 26B:
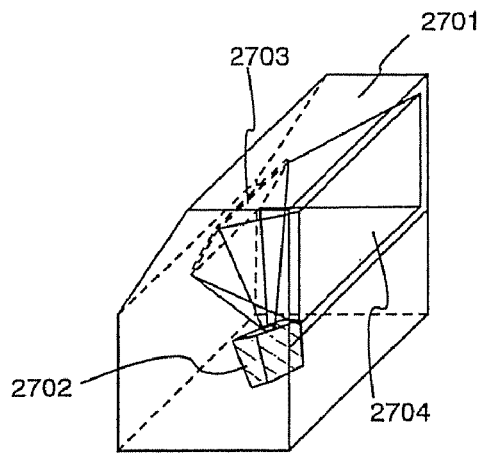

FIG. 26B is a rear-type projector, and it includes a main body 2701, a projection device 2702, a mirror 2703, and a screen 2704. The present invention is applicable to a liquid crystal display device 2808 which comprises one of the projection device 2702.

Figure 26C:
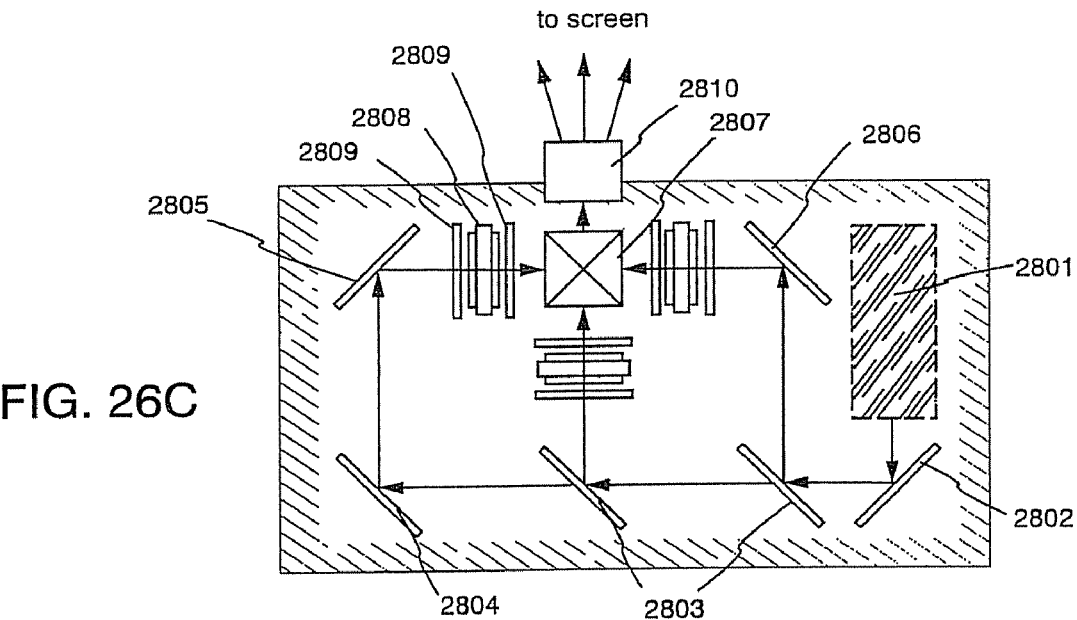

FIG. 26C is a diagram showing an example of the structure of the projection devices 2601, 2702 in FIGS. 26A and 26B. The projection device 2601 or 2702 comprises a light source optical system 2801, mirrors 2802, 2804 to 2806, dichroic mirrors 2803, a prism 2807, liquid crystal display devices 2808, phase difference plates 2809, and a projection optical system 2810. The projection optical system 2810 is composed of an optical system including a projection lens. This example shows an example of three-plate type but not particularly limited thereto. For instance, the invention may be applied also to a single plate type optical system. Further, in the light path indicated by an arrow in FIG. 26C, an optical system such as an optical lens, a film having a polarization function, a film for adjusting a phase difference, and an IR film may be suitably provided by a person who carries out the invention.

Figure 26D:
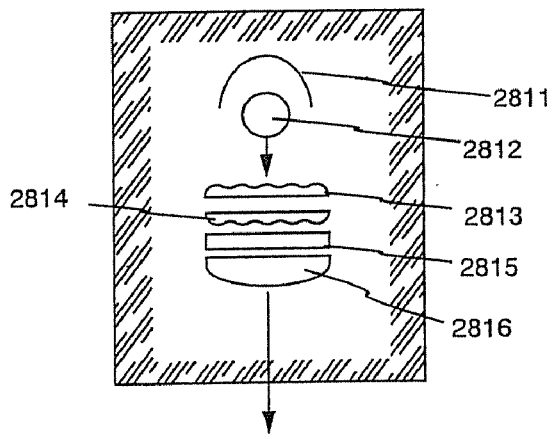

FIG. 26D is a diagram showing an example of the structure of the light source optical system 2801 in FIG. 26C. In this embodiment, the light source optical system 2801 comprises a reflector 2811, a light source 2812, lens arrays 2813, 2814, a polarization conversion element 2815, and a condenser lens 2816. The light source optical system shown in FIG. 26D is merely an example, and is not particularly limited to the illustrated structure. For example, a person who carries out the invention is allowed to suitably add to the light source optical system an optical system such as an optical lens, a film having a polarization function, a film for adjusting a phase difference, and an IR film.

Note that a transmission electro-optical device is used as the projector shown in FIG. 26, a reflection type electro-optical device is not illustrated.

Figure 27A:
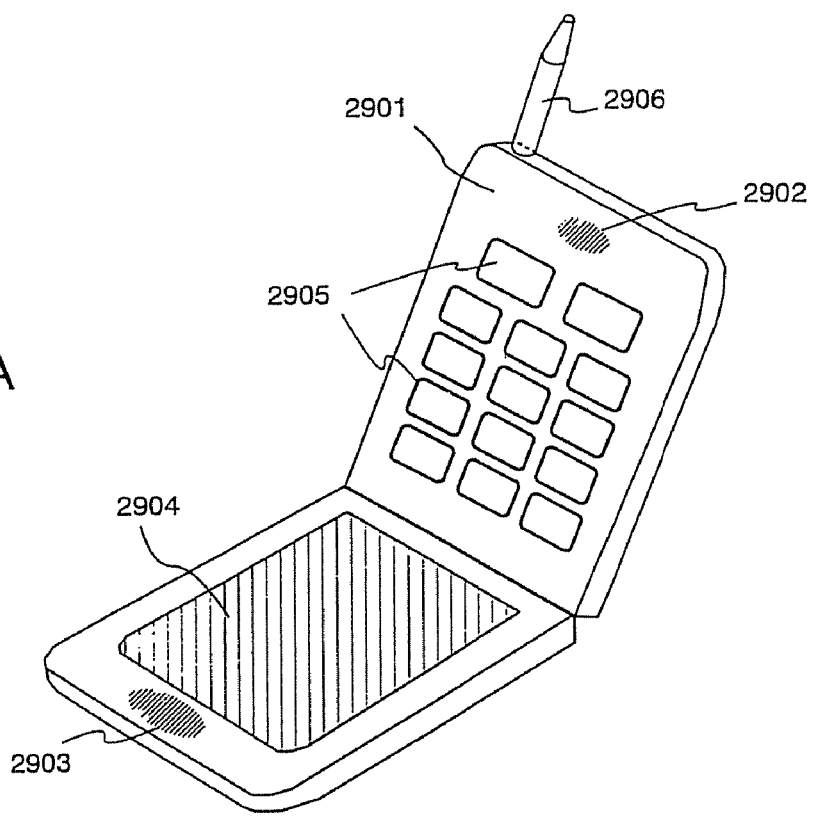
FIGS. 27A to 27C are perspective views showing examples of the electronic devices.

FIG. 27A is a portable telephone, and it includes a main body 2901, an audio output section 2902, an audio input section 2903, a display portion 2904, operation switches 2905, and an antenna 2906. The present invention can be applied to the display portion 2904.

Figure 27B:
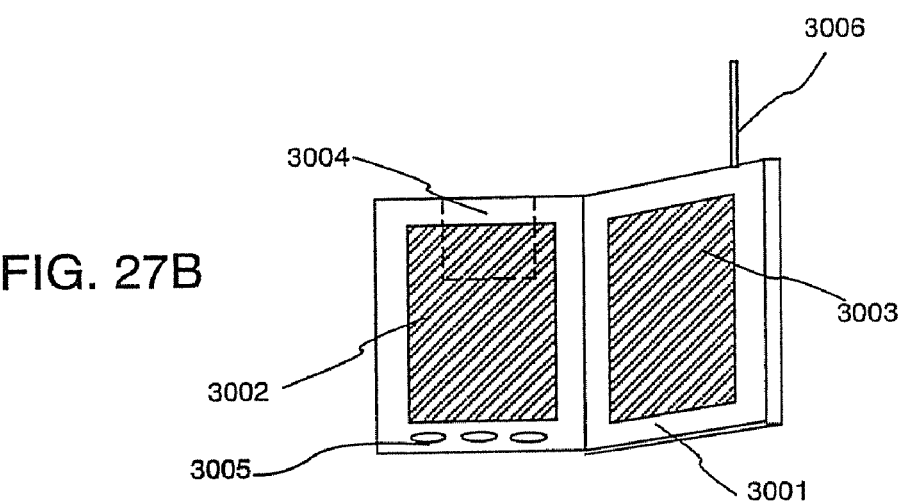

FIG. 27B is a portable book (electronic book), and it includes a main body 3001, display portions 3002 and 3003, a recording medium 3004, operation switches 3005, and an antenna 3006. The present invention can be applied to the display portions 3002 and 3003.

Figure 27C:
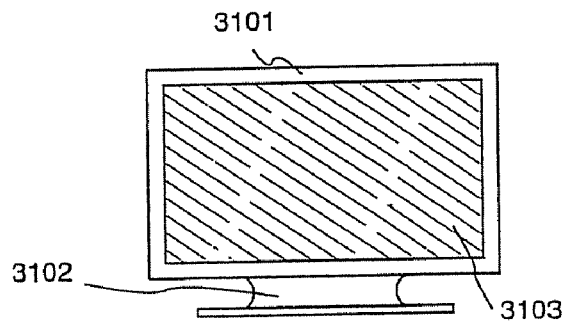

FIG. 27C is a display, and it includes a main body 3101, a support stand 3102, and a display portion 3103. The present invention can be applied to the display portion 3103. The display of the present invention is advantageous for a large size screen in particular, and is advantageous for a display equal to or greater than 10 inches (especially equal to or greater than 30 inches) in diagonal.

The applicable range of the present invention is thus extremely wide, and it is possible to apply the present invention to electronic equipment in all fields. Further, the electronic equipment of Embodiment 3 can be realized by using a constitution of any combination of Embodiments 1 and 2.

As has been described hereinbefore, according to the present invention, the orientation failures of the liquid crystal such as the disclination or optical leakage of the liquid crystal display device when the black level is displayed can be reduced to provide a liquid crystal display device which has a high contrast and an excellent visibility.

Figure 29A:
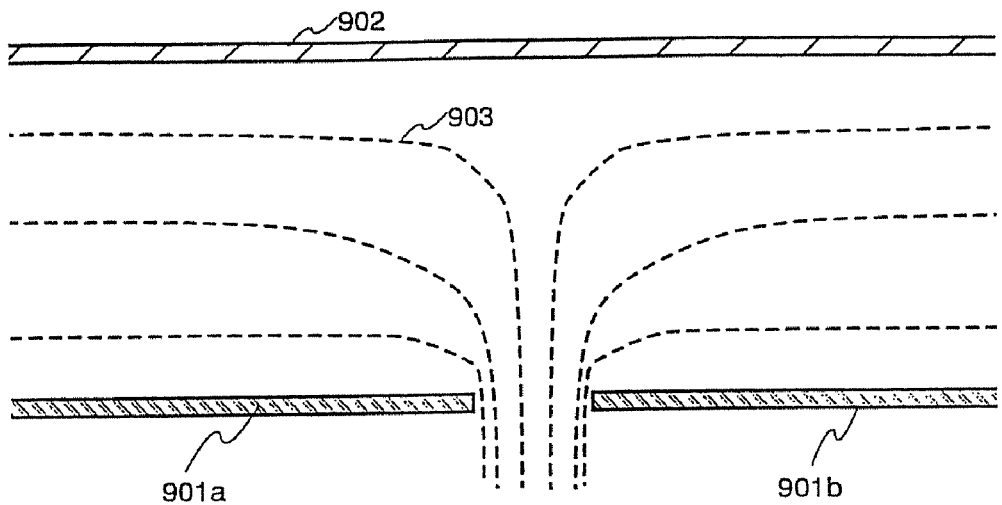
FIGS. 29A to 29C are schematic diagrams showing equipotential lines in which the adjoining pixel electrodes are at potentials of different polarities.
Figure 29B:
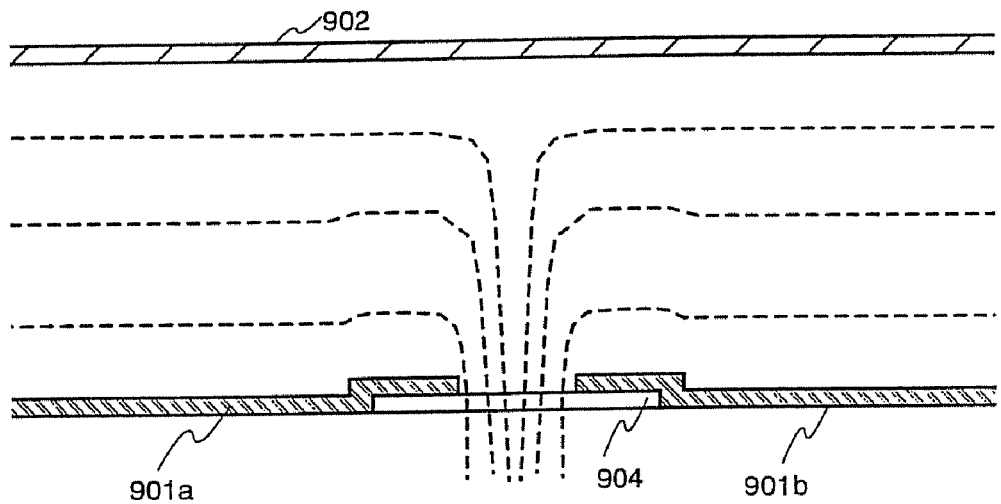
Figure 29C:
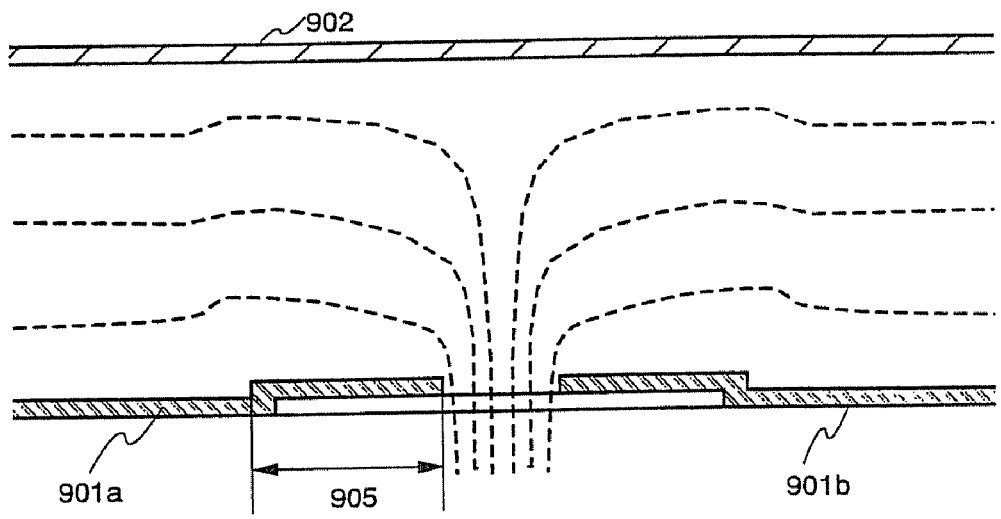
Figure 30A:
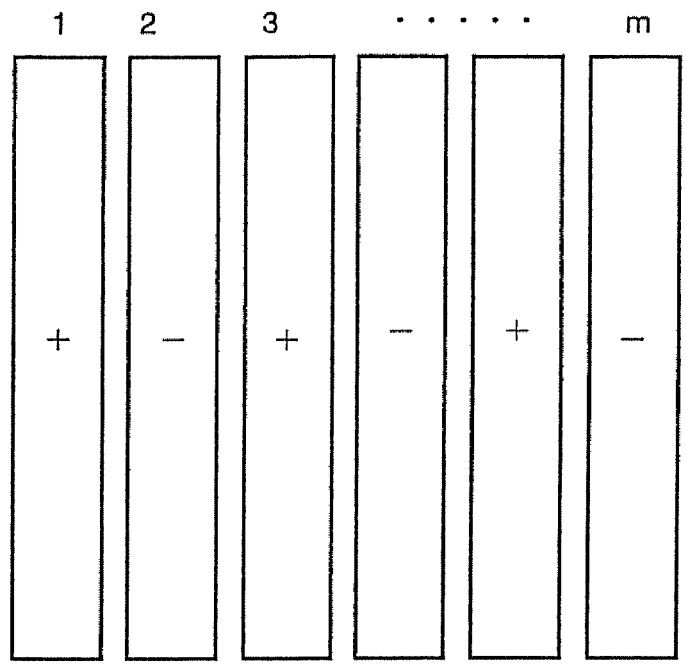
FIGS. 30A and 30B are diagrams showing the polarities of the voltage to be applied to the pixels at the time for a source line inversion drive.
Figure 30B:
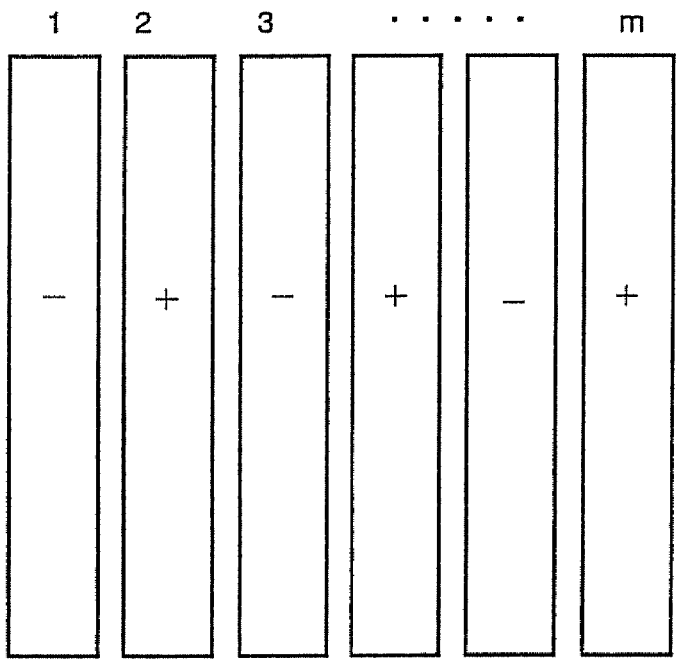
Figure 31A:
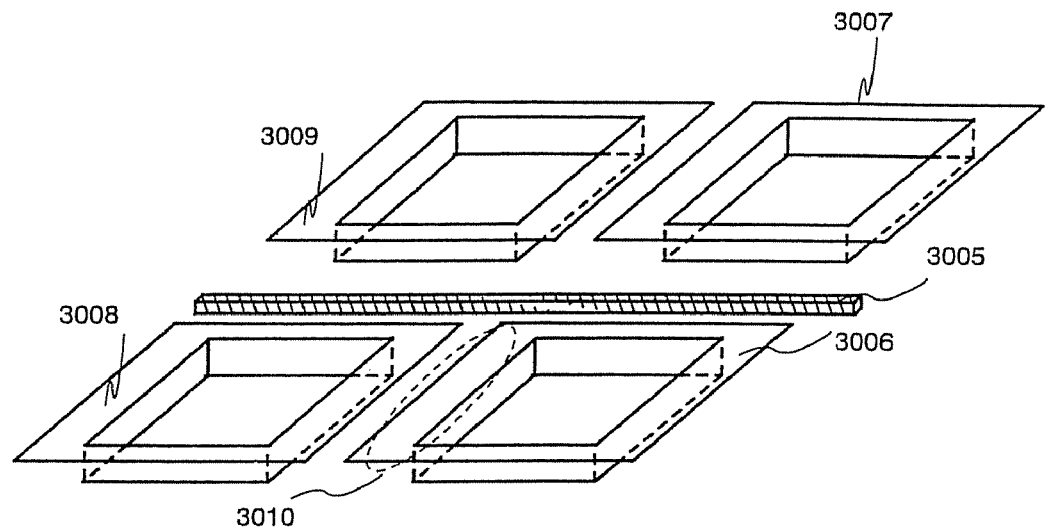
FIGS. 31A and 31B are perspective views showing examples to be compared with the present invention.
Figure 31B:
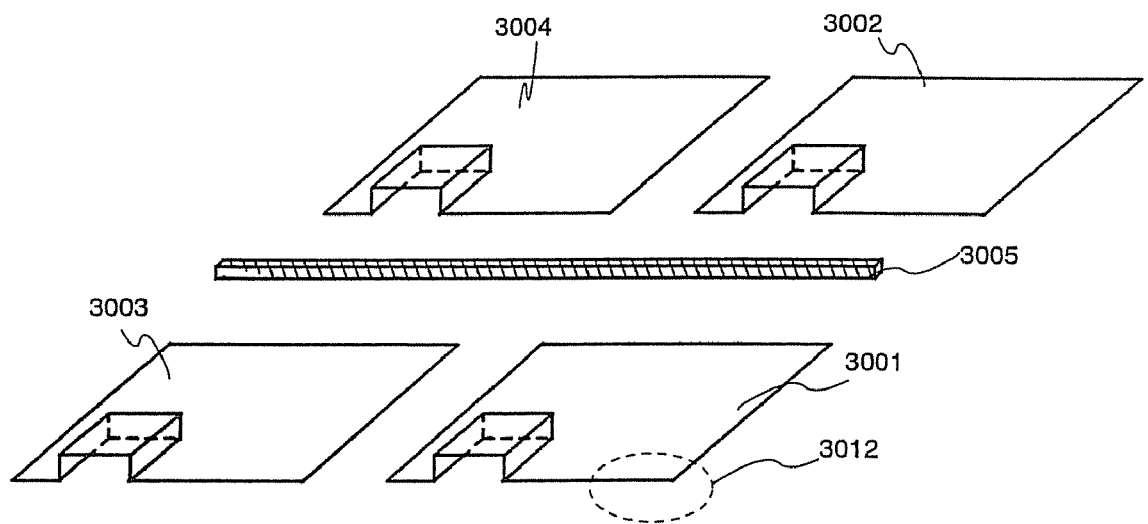

When the adjoining pixel electrodes have the different polarities, as shown in a sectional view in FIG. 29, equipotential lines 903 curve at the end portions of the pixel electrode 901a and the pixel electrode 901b. The opposed electrode 902 is at 0 V (FIG. 29A). If the pixel electrodes 901a and 901b are provided below their first end portions with ridges 904, equipotential lines are formed along the pixel electrodes so that their curvatures are suppressed at the end portions of the pixel electrodes (FIG. 29B). As the overlap widths 905 of the pixel electrodes and the ridges are enlarged, even the equipotential lines intrinsically parallel to the pixel electrode faces will curve (FIG. 29C). Accordingly, the optical leakage and the disclination increase. When the adjoining pixel electrodes are different in polarities, therefore, the ridges below the first end portions of the pixel electrodes are preferably formed to optimize the overlap widths between the pixel electrodes and the ridges.

Figure 28A:
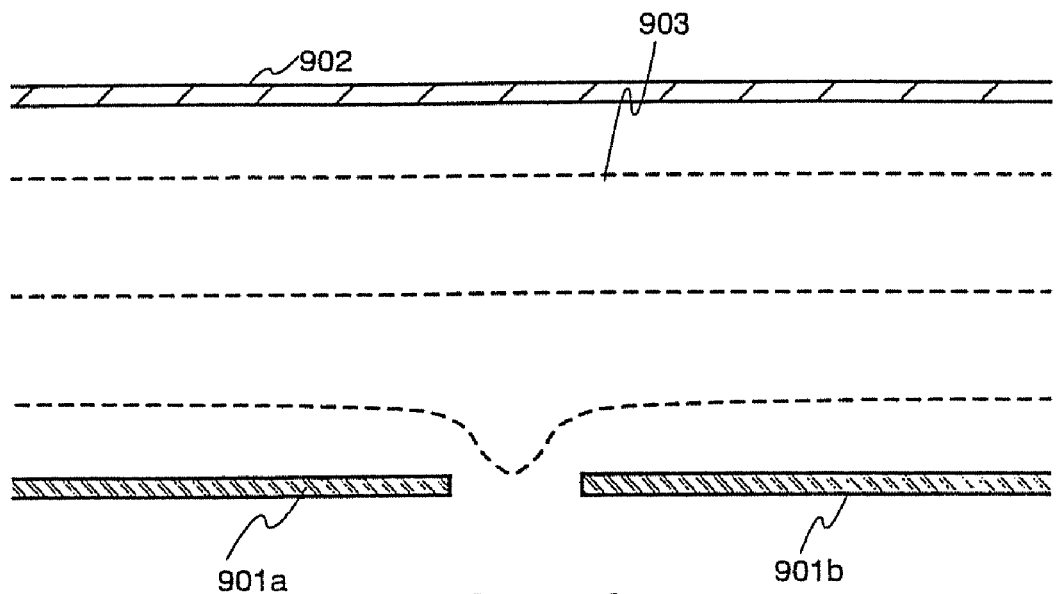
FIGS. 28A and 28B are schematic diagrams showing equipotential lines in which the adjoining pixel electrodes are at potentials of an identical polarity.
Figure 28B:
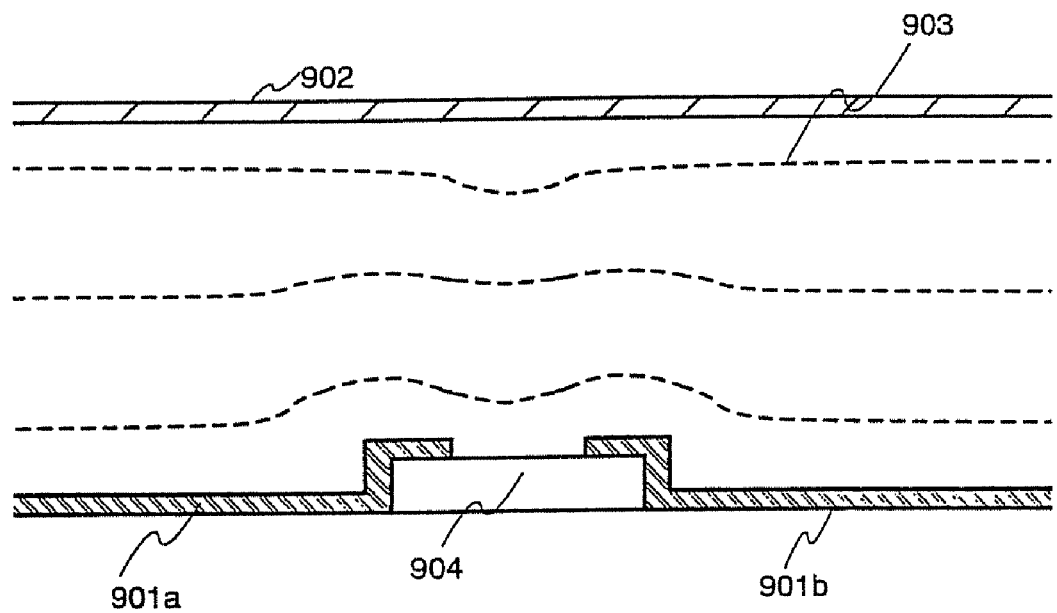

When the adjoining pixel electrodes have the identical polarity, as shown in a sectional view of FIG. 28, the equipotential lines 903 curve at the end portions of the pixel electrode 901a and the pixel electrode 901b, but the curving degrees are small (FIG. 28A). Therefore, the ridges 904 formed below the end portions of the pixel electrodes will increase the curvatures of the equipotential lines to cause adverse effects (FIG. 28B).

The present invention makes use of this principle to prevent the curvatures of the equipotential lines at the end portions of the pixel electrodes thereby to increase the electric field normal to the surface of the opposed electrode and to reduce the disclination and the optical leakage.

What is claimed is:

1. A liquid crystal display device comprising:
   a scanning line over a substrate;
   a signal line intersecting the scanning line over the substrate;
   a pixel electrode electrically connected to the scanning line and the signal line over the substrate; and
   an opposed electrode over the pixel electrode,
   wherein the pixel electrode contains a main face, a first face closer to the opposed electrode than the main face, and a second face closer to the opposed electrode than the first face,
   wherein the first face is extended along the signal line, and
   wherein the second face is adjacent to an intersection between the scanning line and the signal line.

2. A liquid crystal display device according to claim 1, wherein the liquid crystal display device is driven by a source line inversion drive.

3. A liquid crystal display device according to claim 1, wherein the liquid crystal display device is incorporated in one selected from the group consisting of a personal computer, a video camera, a mobile computer, a goggle type display, a DVD player, a digital camera, a projector, a portable telephone, and a portable electronic book.

4. A liquid crystal display device comprising:
   a plurality of pixel electrodes over a substrate, each of the plurality of pixel electrodes containing a main face, and first to fourth end portions enclosing the main face,
   wherein the first end portion is extended along a first signal line, and the third end portion is extended along a second signal line adjacent to the first signal line, and
   wherein the second end portion is extended along a first scanning line and interposed between the first end portion and the third end portion, and the fourth end portion is extended along a second scanning line adjacent to the first scanning line and interposed between the first end portion and the third end portion; and
   an opposed electrode over the plurality of pixel electrodes,
   wherein the second end portion and the fourth end portion are at a same height as the main face, and the first end portion and the third end portion are disposed closer to the opposed electrode than the main face,
   wherein two end portions of the first end portion are further closer to the opposed electrode than the center of the first end portion, and
   wherein two end portions of the third end portion are further closer to the opposed electrode than the center of the third end portion.

5. A liquid crystal display device according to claim 4, wherein the liquid crystal display device is driven by a source line inversion drive.

6. A liquid crystal display device according to claim 4, wherein the plurality of pixel electrodes are adjacent to each other such that a distance between the second end portion of one pixel electrode and the fourth end portion of the other pixel electrode is 2.0 μm or less.

7. A liquid crystal display device according to claim 4, wherein the two end portions of the first end portion are closer by 0.5 μm or more to the opposed electrode than the central portion of the first end portion.

8. A liquid crystal display device according to claim 4, wherein the two end portions of the third end portion are closer by 0.5 μm or more to the opposed electrode than the central portion of the third end portion.

9. A liquid crystal display device according to claim 4, wherein the liquid crystal display device is incorporated in one selected from the group consisting of a personal computer, a video camera, a mobile computer, a goggle type display, a DVD player, a digital camera, a projector, a portable telephone, and a portable electronic book.

10. A liquid crystal display device comprising:
    a scanning line over a substrate;
    a signal line intersecting the scanning line over the substrate;
    a first insulating film over the signal line;
    a second insulating film and a pixel electrode electrically connected to the signal line over the first insulating film; and
    an opposed electrode over the pixel electrode,
    wherein the pixel electrode contains a main face, and a first face closer to the opposed electrode than the main face, and
    wherein the first face is extended along the signal line, and
    wherein an end of the pixel electrode is formed over the second insulating film.

11. A liquid crystal display device according to claim 10, wherein the liquid crystal display device is driven by a source line inversion drive.

12. A liquid crystal display device according to claim 10, wherein the scanning line is in direct contact with the substrate.

13. A liquid crystal display device according to claim 12, wherein the substrate is a quartz substrate.

14. A liquid crystal display device according to claim 10, wherein the main face is in direct contact with the first insulating film.

15. A liquid crystal display device comprising:
    a scanning line over a substrate;
    a signal line intersecting the scanning line over the substrate;
    a pixel electrode; and
    an opposed electrode over the pixel electrode,
    wherein the pixel electrode contains a main face, a first face closer to the opposed electrode than the main face, and second faces closer to the opposed electrode than the first face,
    wherein the first face is extended along the scanning line,
    wherein the first face is located between the second faces, and
    wherein the main face, the first face, and the second faces are faced with the opposed electrode.

16. A liquid crystal display device according to claim 15, wherein the liquid crystal display device is driven by a gate line inversion drive.

17. A liquid crystal display device according to claim 15, wherein the liquid crystal display device is incorporated in one selected from the group consisting of a personal computer, a video camera, a mobile computer, a goggle type display, a DVD player, a digital camera, a projector, a portable telephone, and a portable electronic book.

18. A liquid crystal display device comprising:
    a scanning line over a substrate;
    a signal line intersecting the scanning line over the substrate;
    a first insulating film over the signal line;

a pixel electrode and a second insulating film over the first insulating film; and an opposed electrode over the pixel electrode, wherein the pixel electrode contains a main face, and a first face closer to the opposed electrode than the main face, wherein the first face is extended along the scanning line and is disposed at an edge of the main face, wherein the main face and the first face are faced with the opposed electrode, and wherein an end of the pixel electrode is formed over the second insulating film.

19. A liquid crystal display device according to claim 18, wherein the liquid crystal display device is driven by a gate line inversion drive.

20. A liquid crystal display device according to claim 18, wherein the liquid crystal display device is incorporated in one selected from the group consisting of a personal computer, a video camera, a mobile computer, a goggle type display, a DVD player, a digital camera, a projector, a portable telephone, and a portable electronic book.

21. A liquid crystal display device comprising:

a scanning line over a substrate;

a signal line intersecting the scanning line over the substrate;

a first insulating film over the signal line;

a pixel electrode and a second insulating film over the first insulating film; and an opposed electrode over the pixel electrode, wherein the pixel electrode contains a main face, and a first face closer to the opposed electrode than the main face, wherein the first face is extended along the signal line and is disposed at an edge of the main face, wherein the main face and the first face are faced with the opposed electrode, and wherein an end of the pixel electrode is formed over the second insulating film.

22. A liquid crystal display device according to claim 21, wherein the liquid crystal display device is driven by a source line inversion drive.

23. A liquid crystal display device according to claim 21, wherein the liquid crystal display device is incorporated in one selected from the group consisting of a personal computer, a video camera, a mobile computer, a goggle type display, a DVD player, a digital camera, a projector, a portable telephone, and a portable electronic book.

* * * * *